United States Patent [19]
Huang

[11] Patent Number: 5,669,161
[45] Date of Patent: Sep. 23, 1997

[54] SHOCK-ABSORBING CUSHION

[76] Inventor: Ing-Jing Huang, 15, Reher-Her 1st Street, Kaohsiung, Taiwan

[21] Appl. No.: 749,732

[22] Filed: Nov. 15, 1996

Related U.S. Application Data

[63] Continuation of Ser. No. 624,052, Mar. 29, 1996, abandoned, which is a continuation of Ser. No. 205,631, Mar. 4, 1994, abandoned, which is a continuation-in-part of Ser. No. 4,500, Jan. 14, 1993, abandoned, which is a continuation of Ser. No. 484,827, Feb. 26, 1990, abandoned.

[51] Int. Cl.$^6$ .............. A43B 13/40; A43B 13/20
[52] U.S. Cl. .............. 36/43; 36/29; 36/8.4
[58] Field of Search .............. 36/8.4, 43, 44, 36/29, 35 B, 91, 93

[56] References Cited

U.S. PATENT DOCUMENTS

| | | | |
|---|---|---|---|
| 1,193,608 | 8/1916 | Poulson | 36/29 X |
| 1,382,831 | 6/1921 | Hilker . | |
| 2,028,060 | 1/1936 | Gilbert | 47/23 |
| 2,074,286 | 3/1937 | Sullivan | 36/153 |
| 2,372,218 | 3/1945 | Manson et al. | 5/348 |
| 2,465,265 | 3/1949 | Rssler | 332/3 |
| 2,677,906 | 5/1954 | Reed | 36/71 |
| 2,762,134 | 9/1956 | Town | 36/153 |
| 2,874,826 | 2/1959 | Matthews et al. | 206/1 |
| 3,344,684 | 10/1967 | Steere, Jr. et al. | 74/551.9 |
| 3,765,422 | 10/1973 | Smith | 36/29 X |
| 3,795,994 | 3/1974 | Ava | 36/29 |
| 3,991,420 | 11/1976 | Savarino | 2/2 |
| 4,054,960 | 10/1977 | Pettit et al. | 5/357 |
| 4,115,885 | 9/1978 | Davis | 5/349 |
| 4,217,705 | 8/1980 | Donzis | 36/29 |
| 4,387,516 | 6/1983 | Laux | 36/8.4 X |
| 4,422,194 | 12/1983 | Viesturs et al. | 5/451 |
| 4,517,693 | 5/1985 | Viesturs | 5/451 |
| 4,541,136 | 9/1985 | Graebe | 5/456 |
| 4,614,000 | 9/1986 | Mayer | 5/484 |
| 4,629,433 | 12/1986 | Magid | 441/40 |
| 4,670,995 | 6/1987 | Huang | 36/29 |
| 4,845,861 | 7/1989 | Moumdjian | 36/29 |
| 5,193,246 | 3/1993 | Huang | 16/114 |

FOREIGN PATENT DOCUMENTS

| | | | |
|---|---|---|---|
| 645151 | 3/1964 | Belgium . | |
| 540623 | 7/1922 | France . | |
| 1118087 | 5/1956 | France . | |
| 1240066 | 7/1960 | France . | |
| 2 573 988 | 6/1986 | France . | |
| 807 010 | 6/1951 | Germany . | |
| 31 16 499 | 11/1982 | Germany . | |
| 2050145 | 1/1981 | United Kingdom | 36/29 |
| 0890542 | 11/1982 | United Kingdom . | |

*Primary Examiner*—Ted Kavanaugh
*Attorney, Agent, or Firm*—Jacobson, Price, Holman & Stern, PLLC

[57] ABSTRACT

Shock absorbing cushion structures are disclosed which are formed by upper and lower sheets peripherally sealed and formed to define a series of intercommunicating air chambers therebetween. In particular there is disclosed a shock absorbing shoe insole of this kind in which a flowable substance such as a medicinal or deodorant power is contained in the air chambers. The upper sheet is provided with an array of pinholes through which the flowable substance is released into a shoe by the application of pressure to the insole during walking. Also disclosed is a technique for making insoles in a range of sizes from a single molding.

3 Claims, 26 Drawing Sheets

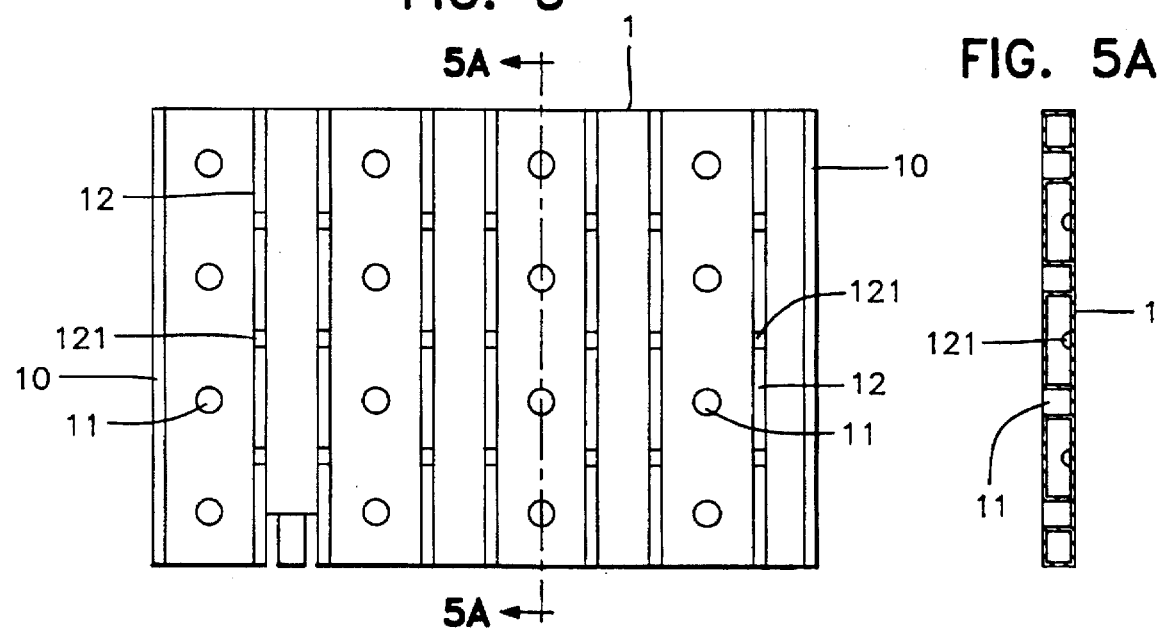
FIG. 5
FIG. 5A
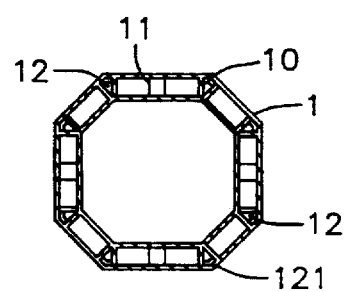
FIG. 5B

FIG. 6
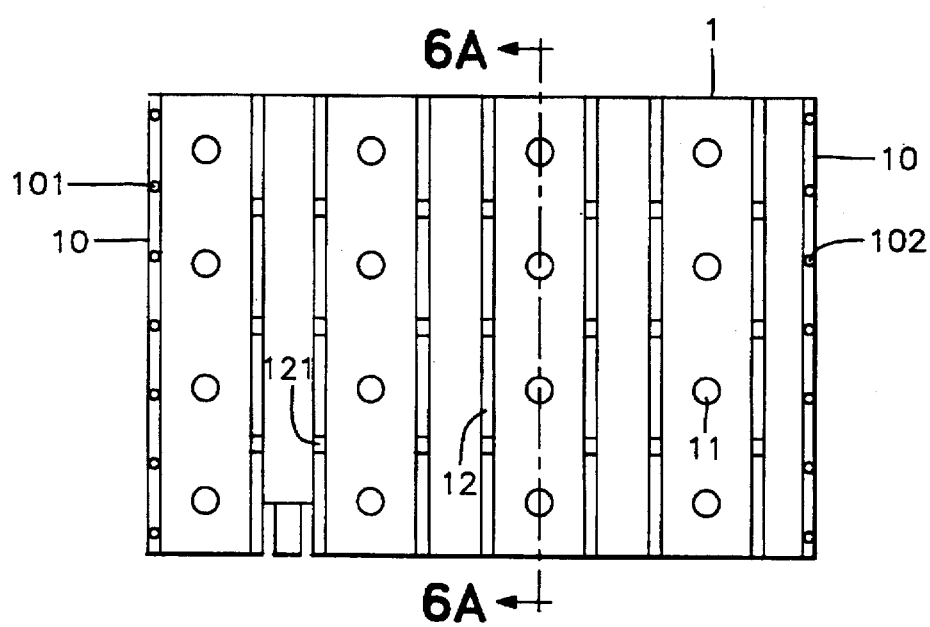
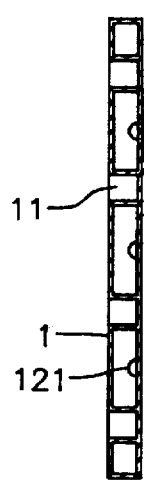
FIG. 6B
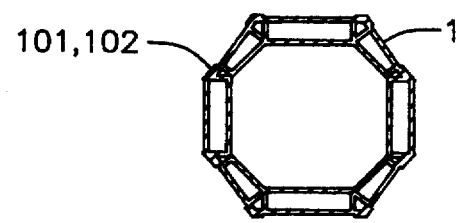

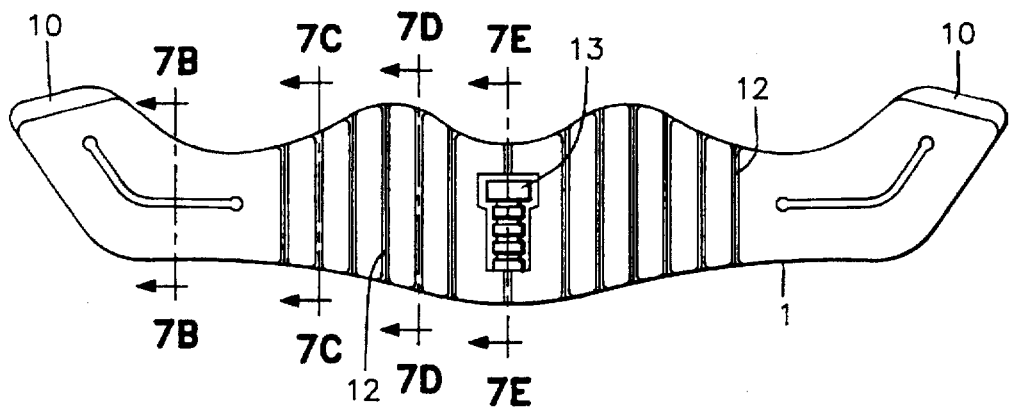
FIG. 7
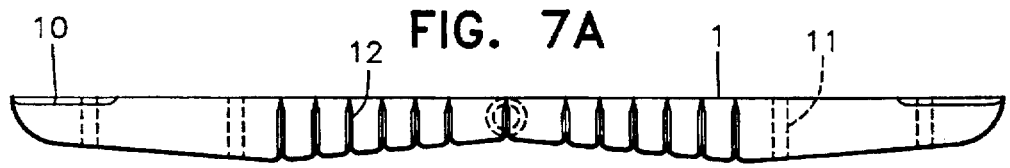
FIG. 7A
FIG. 7B    FIG. 7C    FIG. 7D    FIG. 7E
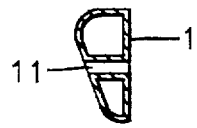 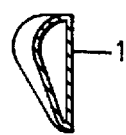 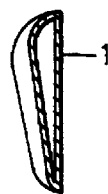 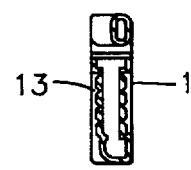
FIG. 8
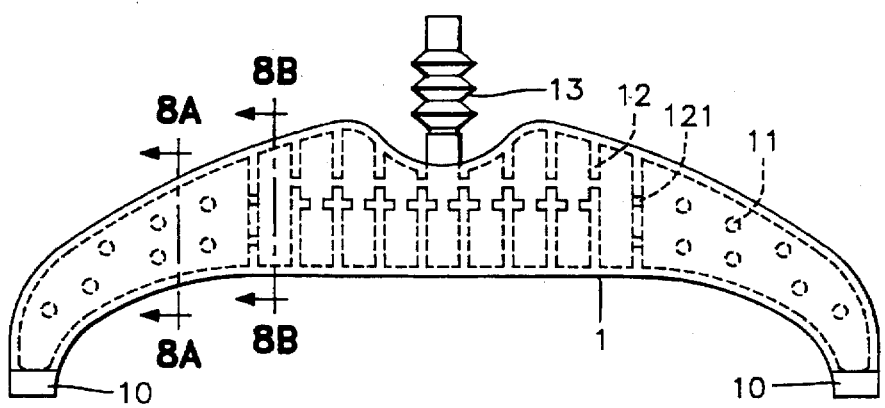
FIG. 8A
FIG. 8B
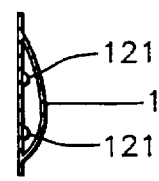

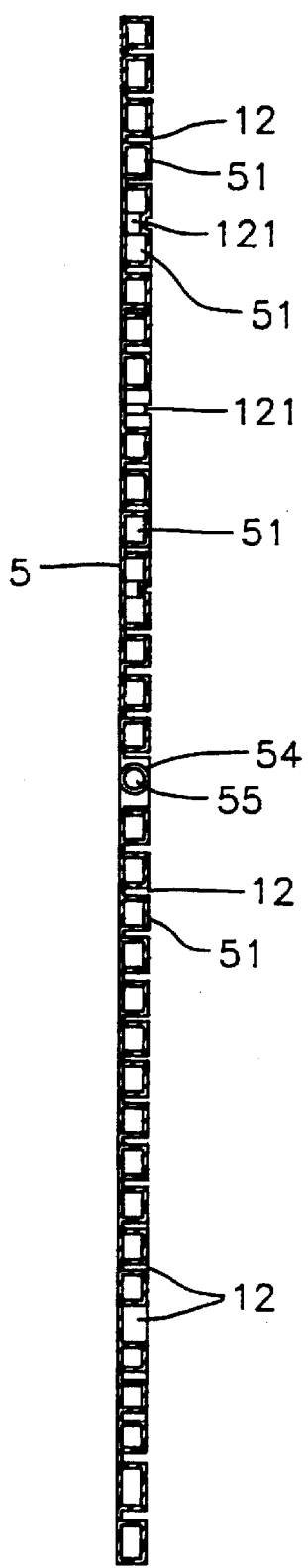
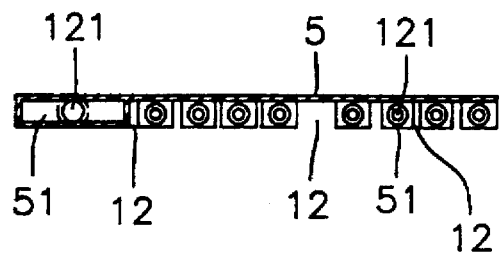
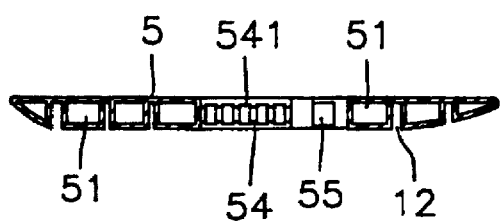
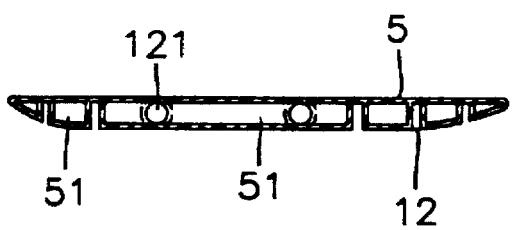
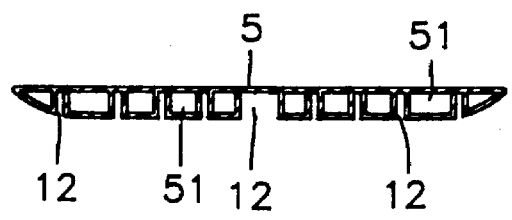
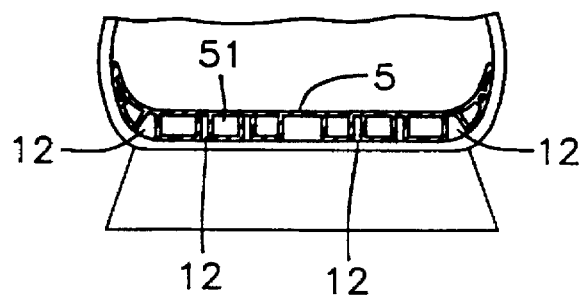

FIG. 35
FIG. 35A
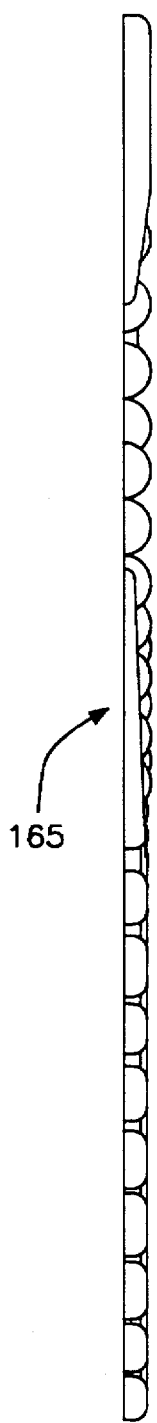
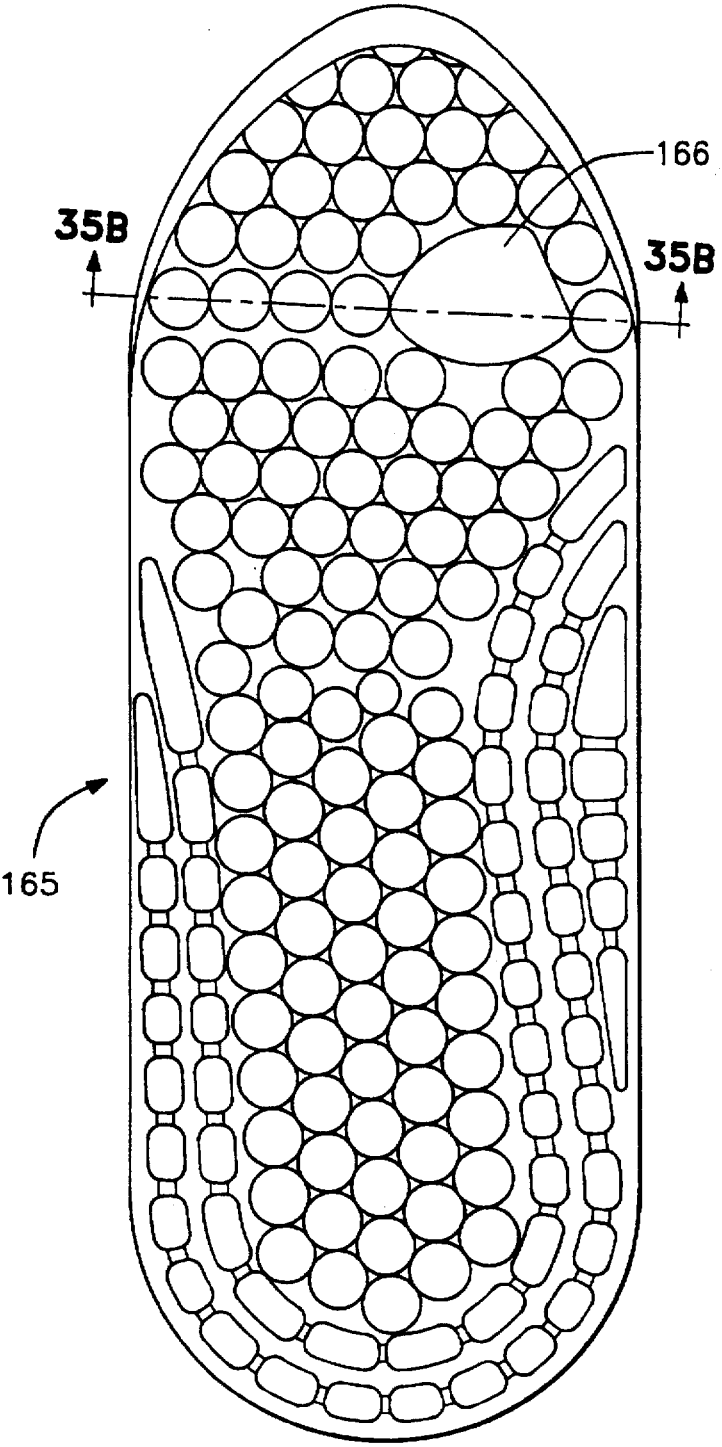
FIG. 35B

FIG. 37
FIG. 37A
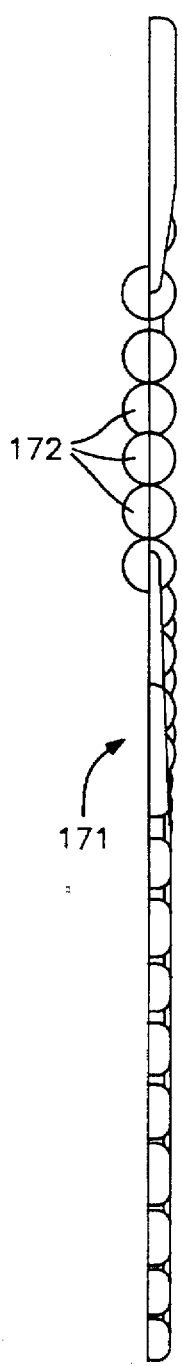
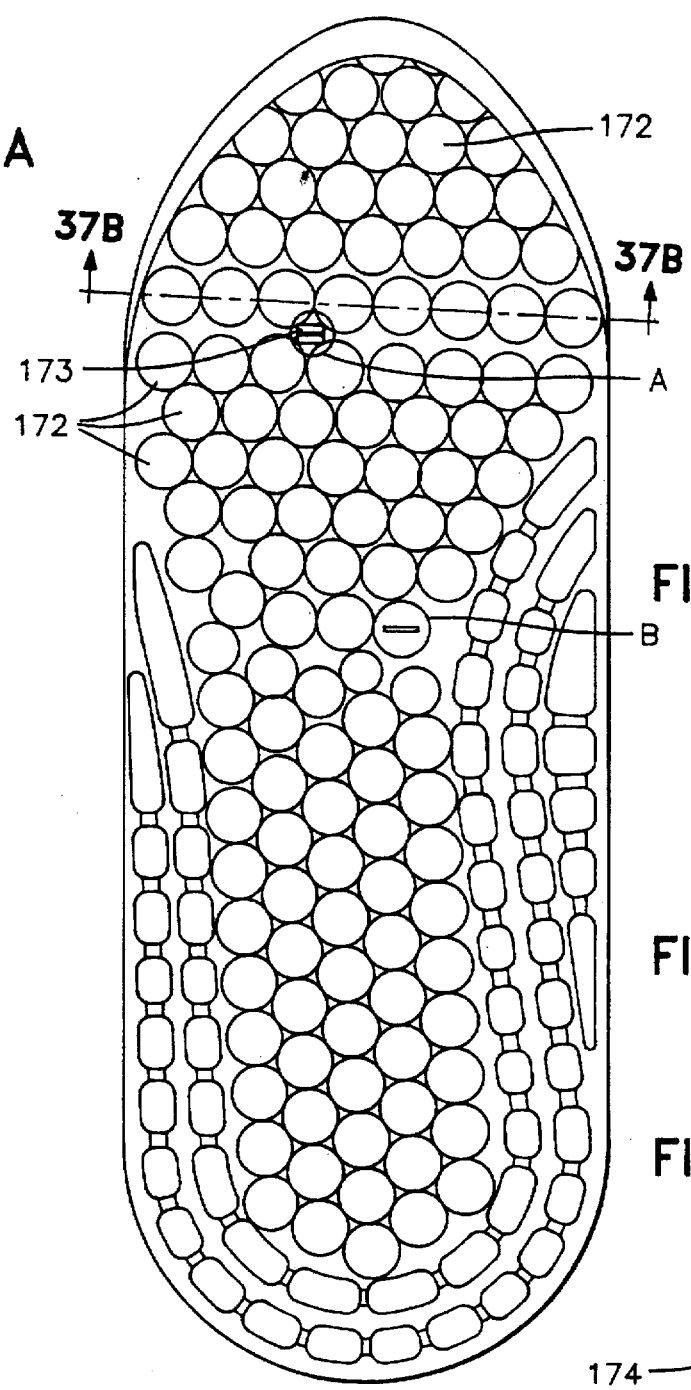
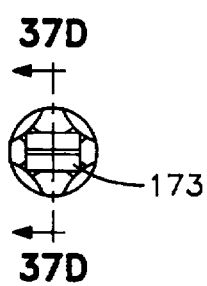
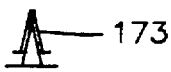
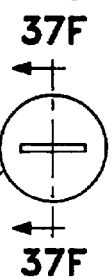
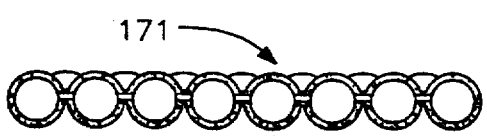
FIG. 37C
FIG. 37D
FIG. 37E
FIG. 37B
FIG. 37F

SHOCK-ABSORBING CUSHION

CROSS-REFERENCE TO RELATED APPLICATIONS

This is a Continuation of application Ser. No. 08/624,052, filed Mar. 29, 1996 which was abandoned upon the filing hereof; which in turn is a Continuation of Ser. No. 08/205, 631, filed Mar. 4, 1994, now abandoned; which in turn is a continuation in part of Ser. No. 08/004,500, filed Jan. 14, 1993, now abandoned; which in turn is a Continuation of Ser. No. 07/484,827, filed Feb. 26, 1990 now abandoned. The contents of the prior applications are expressly incorporated herein by reference.

BACKGROUND OF THE INVENTION

This invention relates to shock-absorbing cushions. Commonly used shock-absorbing cushions are formed of air-cell cloth, foam plastic or rubber, etc., but they have the following defects in practical use.

1. The air-cell cloth is made of two sheets sealed together to pinch a plurality of independent air cells not communicating with one another, and each air cell is at atmospheric pressure which is unadjustable, having a constant shock-absorbing force so that it cannot be changed to cope with different objects.

2. The air cells contained in air-cell cloth are separately sealed to have the same inner pressure as the exterior atmospheric pressure, having no inherent supporting force for pressure or shock. Therefore, if the air cell(s) should be broken and become flat with the air having escaped, it (they) would have no supporting force for pressure or shock, and the cloth would become useless.

3. Every air cell in air-cell cloth is independent, and sealed to have a constant pre-set pressure, unable to be changed by inflation to have a wide adaptability.

4. Air-cell cloth has a flat shape, unable to be formed as a cubic shape having three dimensions.

5. The inner pressure of the air cells in air-cell cloth can not exceed 1 atm (kg/cm2) or 14.7 psi, restricted by its manufacturing method of "vacuum absorbing formation" so that air-cell cloth is impossible to make if the thickness or the hardness of the material surpasses a certain value, with the result that the supporting force of the air-cell cloth cannot be changed by the thickness, the hardness of the material, the shape or the size of the air cells.

6. Each air cell in air-cell cloth receives a different shock force when struck by an exterior object and the cloth is unable to disperse evenly the shock force received mainly because the cells do not communicate with one another.

7. A solid shock-absorbing cushion of foam plastic has a certain shock-absorbing force restricted by the property of the material so that it can hardly be used for different occasions, objects or things.

8. As the shape of a solid shock-absorbing cushion is impossible to change once made by a mold, it can hardly meet the necessity to protect the object it is used for by conforming completely to the shape and the size of the object.

9. U.S. Pat. No. 4,054,960 titled "Inflatable Body Support Cushion Particularly to Support a Woman During Pregnancy" is a king of air-cushion bed for a pregnant woman made of a moldable material, but does not have the function of flexibility or inherent supporting force, as can be seen on page 1, lines 50–51 in the patent specification.

10. U.S. Pat. No. 4,629,433 titled "Inflatable Articles and Method of Making Same" acquired by Magid, has a preventing function of deforming and extension of an inflatable article once inflated with air, but it is made of pieces so that the articles have no inherent supporting force, as can be seen on page 1, lines 64–65 and page 6, lines 67–68 in the patent specification.

11. U.S. Pat. No. 1,382,831 titled "Pneumatic Cushion" is a sealed bag made of two sheets of material and said two sheets have thickened inner sides such that the bag can hold the outer surface flat after it is inflated with air. But it can hardly be flexible and lacks vertical supporting force against pressure.

12. U.S. Pat. No. 2,465,265 titled "Pneumatic Bed" acquired by Rogers is a bag made of two sheets sealed at the circumferential edge and a third sheet is additionally put between and connected with the two sheets so that it can hold an extremely flat surface, but it has no flexibility or inherent supporting force against pressure or shock, as can be seen on pages 1–2, lines 49–52.

13. U.S. Pat. No. 2,372,218 titled "Pneumatic Mattress" is provided with valves to inflate or deflate the mattress, but said pneumatic mattress has no inherent supporting force against pressure and the inflating valves have a different structure and function from the flexible pump to be disclosed herein.

14. U.S. Pat. No. 4,115,885 titled "Water Cushion and Method of Using the Same" acquired by Davis is a shock-absorbing bag filled with water, having no vertical supporting force against pressure.

15. U.S. Pat. No. 4,217,705 titled "Self-Contained Fluid Pressure Foot Support Device" is a bag sealed around the periphery of two sheets of non-elastic fabric and having a special section provided with round hollow cells defined by hot sealing, said round hollow cells being inserted by foot supporting cushions for supporting a foot. The cushion body is originally flat and has no inherent supporting force against pressure, as can be seen on page 7, lines 7–10. The so called supporting force is caused by the foot supporting cushions.

16. U.S. Pat. No. 2,677,906 titled "Cushioned Inner Sole for Shoes and Method of Making the Same" acquired by Reed is a shoe sole made of two sheets having the periphery heat sealed and another sheet connected with the upper and the lower sheets so as to make up an inner shoe sole having a specially flat surface. But the air cushion has little flexibility and air cells independent to one another, whereby it is impossible to disperse the pressure received evenly around the structure and the inflating operation is complicated as well.

17. U.S. Pat. No. 3,991,420 titled "Protective Baseball Batting Garment" acquired by Savarino is a protective jacket for baseball batting but the padded sections are not provided with air cushions.

18. U.S. Pat. No. 4,614,000 titled "Patient Undersheet for Preventing Bed Sores" acquired by Mager is a bed undersheet for a patient having a sheet of air-cell cloth with a sheet of fabric mounted thereon. The air-cell cloth has no structure or supporting force, nor does its air-cells communicate with one another, so it cannot be developed to make up a three-dimensional structure.

19. French Patent No. 540,623 is an air cushion made of two sheets of material sealed such that a plurality of independent air cells are formed therein, without any linking passages among the air cells. The air cushion has little flexibility and each air cell does not have even pressure.

20. Belgian Patent No. 645,151 is a shock-absorbing cushion made of two sheets of material with a water absorbing layer sandwiched between the two sheets, and the two sheets are provided with round recesses. It is made of two flat sheets, devoid of potential supporting force against pressure or shock, nor can it be inflated.

21. German Patent No. 807,010 titled "Soft Layer Baby Diaper" is provided with an inflated air cushion attached to an inflating pump. The cushion body is made of two sheets, devoid of inherent supporting force against pressure of flexibility caused by the absence of communicating passages.

22. French Patent No. 1,118,087 is made of two sheets sealed together with heat, and an extra two sheets are connected with said two sheets by means of round recesses, on which through holes are provided for air flow, so it lacks potential supporting force against shock or pressure.

23. U.S. Pat. No. 2,028,060 titled "Protector" 10 acquired by Gilbert is an inflatable sport protecting cushion made of a plurality of square hollow tubes combined together and communicating with each other by means of connecting tubes. As it is provided with two sheets having square grooves, the square tubes may be deformed after being inflated so that the surface may not be flat enough.

24. U.S. Pat. No. 4,670,995 titled "Method for Manufacturing Soles with an Air Cushion" acquired by the same applicant as the present application is a shoe sole having a structure of two sheets provided with round recesses. Although it has an even pressure pervasion owing to the communication air-cells, flexibility and an inherent supporting force against pressure, it has a drawback that the smoothness of the surface is not so good after being inflated because of the pending supporting force of the air cells.

The U.S., French, German and Belgian patents discussed above have common drawbacks that they have little or no inherent supporting force against pressure or shock, little flexibility, and can have an unsmooth surface after being filled with air. Besides, they cannot be combined to make up an air cushion with a cubic structure to conform to a curved surface of the human body and to have an inherent shock-absorbing force, excellent flexibility and evenly pervasive pressure.

In view of the defects in conventional shock-absorbing cushions, this applicant has acquired U.S. Pat. Nos. 4,670, 995 and 7,422,131, Japanese Patent No. 1,709,140, Korean Patent No. 35,963 and Australian Patent No. 564,808 for an invention relating to an air cushion for a shoe sole. Now this applicant has further devised the present invention to furnish a shock-absorbing cushion that has the possibility of adjusting the inner pressure, flexibility in being adaptable to any hollow shape, the largest shock-absorbing dimension, and an inherent supporting force against pressure or shock. That is, this shock-absorbing cushion has in its hollow interior, a plurality of air cells communicating with one another, so that when inflated, air can flow here and there in the interior, and an inherent shock-absorbing elasticity even if it is broken. It can widely be applied to sports goods such as leg or shin guards, knee pads, shoulder pads, racket grips, football helmets, shoe soles, tools, seat cushions, and above have common drawbacks that they have little or no inherent supporting force against pressure or shock, little flexibility, and can have an unsmooth surface after being filled with air. Besides, they cannot be combined to make up an air cushion with a cubic structure to conform to a curved surface of the human body and to have an inherent shock-absorbing force, excellent flexibility and evenly pervasive pressure.

In view of the defects in conventional shock-absorbing cushions, this applicant has acquired U.S. Pat. Nos. 4,670, 995 and 7,422,131, Japanese Patent No. 1,709,140, Korean Patent No. 35,963 and Australian Patent No. 564,808 for an invention relating to an air cushion for a shoe sole. Now this applicant has further devised the present invention to furnish a shock-absorbing cushion that has the possibility of adjusting the inner pressure, flexibility in being adaptable to any hollow shape, the largest shock-absorbing dimension, and an inherent supporting force against pressure or shock. That is, this shock-absorbing cushion has in its hollow interior, a plurality of air cells communicating with one another, so that when inflated, air can flow here and there in the interior, and an inherent shock-absorbing elasticity even if it is broken. It can widely be applied to sports goods such as leg or shin guards, knee pads, shoulder pads, racket grips, football helmets, shoe soles, tools, seat cushions, and packing material, utilizing the features just mentioned above.

SUMMARY OF THE INVENTION

The shock-absorbing cushion according to the present invention comprises two sheets sealed together at the periphery to have a hollow interior. One of the two sheets, the upper or the lower, is flat, smooth and completely closed, i.e., it is continuous and has no recesses or other depressions formed therein but the other sheet, the lower or the upper, is provided with a plurality of recesses which may be holes and/or grooves with vertical walls which may or may not link with said one of the sheets. If the vertical walls of the holes or the grooves do not link with said one of the sheets, they have their bottoms separated from said one of the sheets with gaps. The holes and/or the grooves can be planted to be located all over the lower sheet, regularly or irregularly.

The vertical walls of the holes and/or the grooves pull both the sheets together, making up a cubic supporting structure of the shock-absorbing cushion, which has a hollow interior filled with air, a gas, a liquid or a semisolid material. Then the cubic supporting structure can have an inherent supporting force against pressure or shock.

If the vertical walls of the holes and/or the grooves are linked to said one of the sheets, the shock-absorbing cushion can hardly swell up or deform after being inflated with air or filled in with a liquid or a semi-solid material. But if said walls are not linked with said one of the sheets, the shock-absorbing cushion may swell up a little after being inflated, as it has a freer hollow interior. The lengthwise cross-section of each recess can be triangular, square, round etc., and the crosswise cross-section of the hole can be vertically or non-vertically trapezoidal, triangular, square, etc. The groove can have its lengthwise cross-section as a straight or curved line and its crosswise cross-section as vertically or non-vertically trapezoidal, triangular, square, etc.

The grooves can also make the shock-absorbing cushion be provided with a plurality of independent air chambers and a tubal passage can be provided between the grooves to communicate the given air chambers so as to furnish said cushion with a degree of flexibility for bending. An end slip can be respectively attached at both the lengthwise ends of the shock-absorbing cushion to glue, stick or sew together said cushions when applied to a racket grip, or the like.

The shock-absorbing cushion can additionally be provided with a hollow tube, which can be connected with an air valve, a one-way valve or a connecting tube of another air cushion system. The shock-absorbing cushion in the present invention can be applied to sports goods such as a knee pad, a shoulder pad, a football helmet, a racket grip, a shoe sole, a shoe tongue, a shoe counter, and packing material, and so on. The holes and/or the grooves can be combined together with a wide variety of combinations to suit to the objects that the shock-absorbing cushion is applied to.

BRIEF DESCRIPTION OF THE DRAWINGS

FIG. 5 is a top plan of a fifth example of shock-absorbing cushion in accordance with the present invention.

FIG. 5A is a cross-sectional view taken on line 5A—5A of FIG. 5.

FIG. 5B is a cross-sectional view of the fifth example applied to a racket grip.

FIG. 6 is a top plan of a sixth example of shock-absorbing cushion in accordance with the present invention.

FIG. 6A is a cross-sectional view taken on line 6A—6A of FIG. 6.

FIG. 6B is a cross-sectional view taken on line 6B—6B of FIG. 6.

FIG. 7 is a front view of a seventh example of shock-absorbing cushion applied to the upper section of a shoe counter.

FIG. 7A is a plan view of FIG. 7. FIG. 7B is a cross-sectional view on line 7B—7B of FIG. 7.

FIG. 7C is a cross-sectional view on line 7C—7C of FIG. 7.

FIG. 7D is a cross-sectional view on line 7D—7D of FIG. 7.

FIG. 7E is a cross-sectional view on line 7E—7E on FIG. 7.

FIG. 8 is a front view of an eighth example of shock-absorbing cushion applied to a shoe counter.

FIG. 8A is a cross-sectional view on line 8A—8A of FIG. 8.

FIG. 8B is a cross-sectional view on line 8B—8B of FIG. 8.

FIG. 20A is a cross-sectional view on line 20A—20A of FIG. 20.

FIG. 20B is a cross-sectional view on line 20B—20B of FIG. 20.

FIG. 20C is a cross-sectional view on line 20C—20C of FIG. 20.

FIG. 20D is a cross-sectional view on line 20D—20D of FIG. 20.

FIG. 20E is a cross-sectional view on line 20E—20E of FIG. 20.

FIG. 21 is a cross-sectional view of a twenty-first example of shock-absorbing cushion applied to the shoe sole (1) of FIG. 20 placed inside a shoe.

FIGS. 35, 35A and 35B are a plan view, an elevational view and a sectional view on line 35—35, respectively, still another air cushion insole.

FIGS. 37, 37A and 37B are respectively a plan view, an elevational view and a sectional view on line 37B—37B, respectively, of still another air cushion insole.

FIG. 37C is an enlarged view of the encircled area indicated by arrow A in FIG. 37.

FIG. 37D is a sectional view on line 37D—37D of FIG. 37C.

FIG. 37E is an enlarged view of the encircled area indicated by arrow B in FIG. 37.

FIG. 37F is a sectional view on line 37F—37F of FIG. 37E.

DETAILED DESCRIPTION OF THE INVENTION

Figure 1:
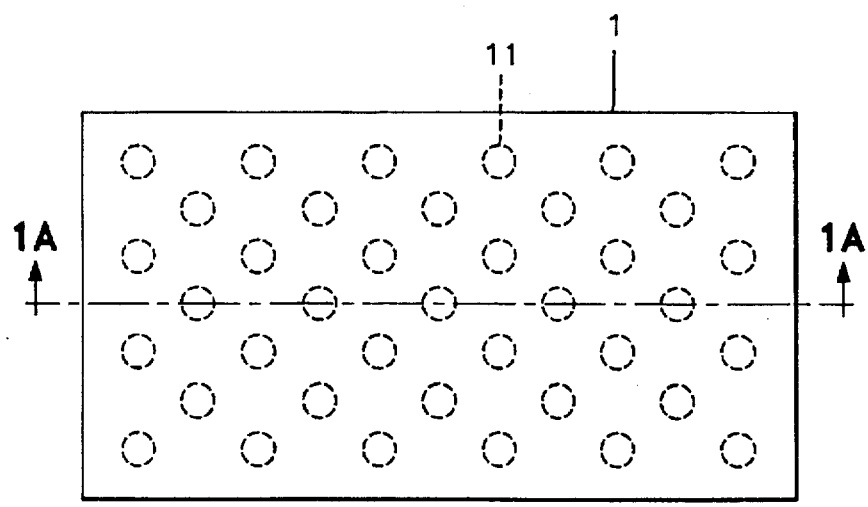
FIG. 1 is a top plan of a first example of a shock-absorbing cushion in accordance with the present invention.
Figure 1A:
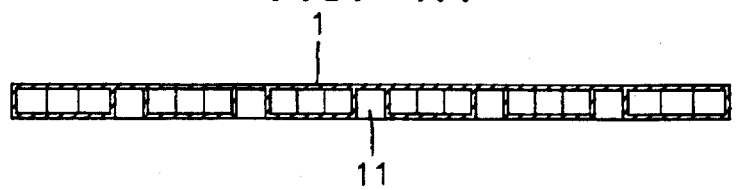
FIG. 1A is a cross-sectional view taken on line 1A—1A of FIG. 1.

At first, referring to FIG. 1, the shock-absorbing cushion 1 is formed by injecting material into a hollows mold, to provide two sheets, one upper and one lower, sealed at the periphery and a plurality of circular recesses 11 with vertical walls which are formed in the lower sheet and the circumferential vertical walls of said recesses are linked with the upper of said two sheets. The upper sheet is flat and continuous without any recesses. Therefore, the shock-absorbing cushion 1 has a hollow interior provided with a plurality of round vertical walls surrounding said recesses, and naturally filled with air after said shock-absorbing cushion is formed. The vertical circumferential walls of the recesses 11 can produce a certain inherent supporting force against pressure or shock so that the shock-absorbing cushion can have a inherent elasticity against pressure or shock. Besides, the walls of the recesses 1 make up a net-shaped structure pulling both the sheets together so that the whole shock-absorbing cushion 1 may not be deformed to bulge up or shrink down by inflating or pressure. The position of the recesses 11 can be regular or irregular and their shape can be triangular, square, round, oval or of any geometrical shape in plan view. The cross-section of the recesses 11 can be trapezoid, triangle, square, rectangle, vertical or non-vertical.

Figure 2:
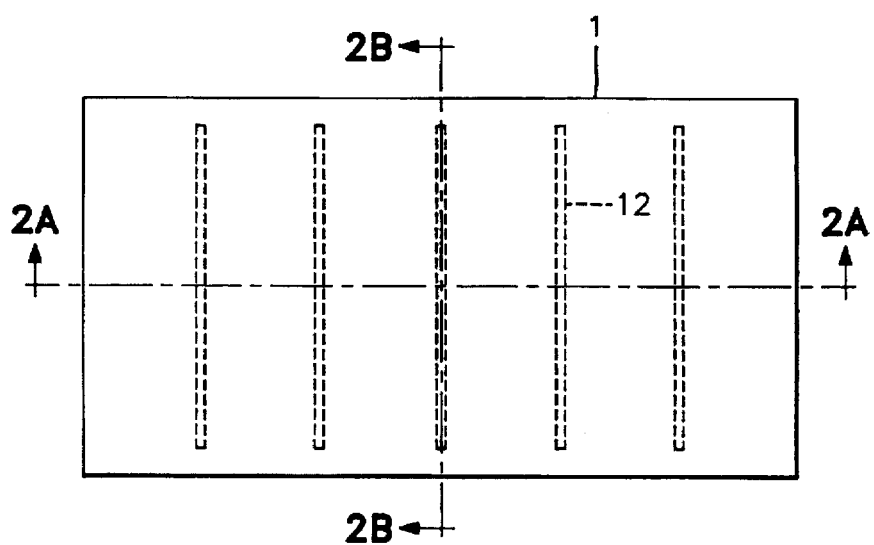
FIG. 2 is a top plan of a second example of a shock-absorbing cushion in accordance with the present invention.
Figure 2B:
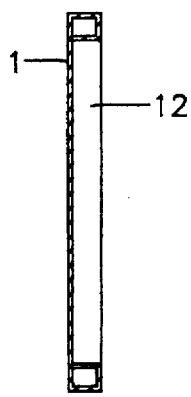
FIG. 2B is a cross-sectional view taken on line 2B—2B of FIG. 2.
Figure 2A:
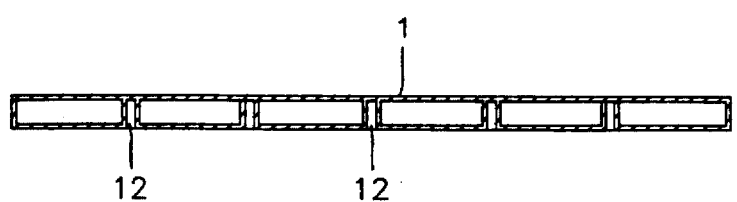
FIG. 2A is a cross-sectional view taken on line 2A—2A of FIG. 2.

The second example shown in FIGS. 2, 2A and 2B comprises two sheets sealed at the periphery as the first example, and a plurality of recesses in the form of long straight grooves 12 in the lower sheet. Each groove is surrounded by vertical circumferential walls linking with the upper one of the sheets and the grooves can be straight or curved in plan view and have a cross-section shaped as trapezoid, triangle, square, rectangle, vertical or non-vertical.

Figure 3:
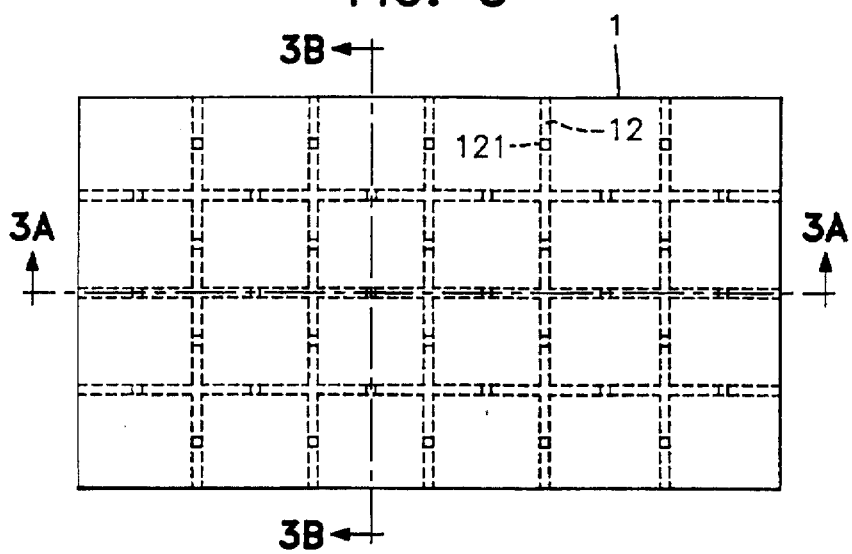
FIG. 3 is a top plan of a third example of shock-absorbing cushion in accordance with the present invention.
Figure 3B:
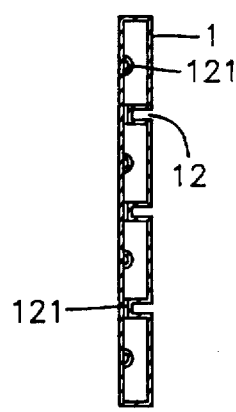
FIG. 3B is a cross-sectional view taken on line 3B—3B of FIG. 3.
Figure 3A:
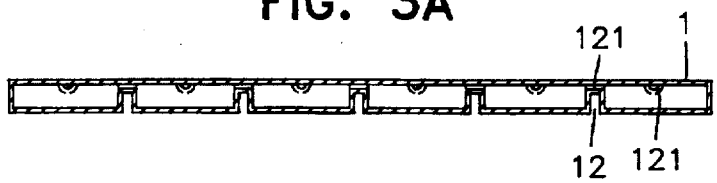
FIG. 3A is a cross-sectional view taken on line 3A—3A of FIG. 3.

The third example shown in FIGS. 3, 3A and 3B comprises a plurality of long straight grooves 12 in the lower sheet, which divide the shock-absorbing cushion 1 into a plurality of independent hollow air chambers. Then a plurality of tubal passages 121 are provided lengthwise for each two neighboring air chambers. The positions of the grooves 12 can be planned such that the shock-absorbing cushion 1 can bend. The hollow spaces in the grooves 12 for closing or opening can give special flexibility to the shock-absorbing cushion 1 without compressing its material in bending. It is evident that in this example, the vertical walls of the grooves do not link with the upper sheet.

Figure 4:
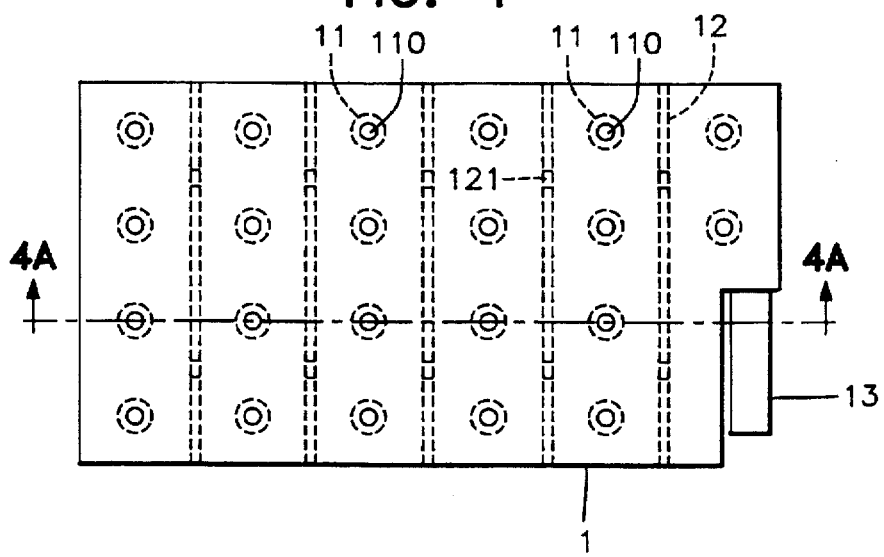
FIG. 4 is a top plan of a fourth example of shock-absorbing cushion in accordance with the present invention.
Figure 4A:
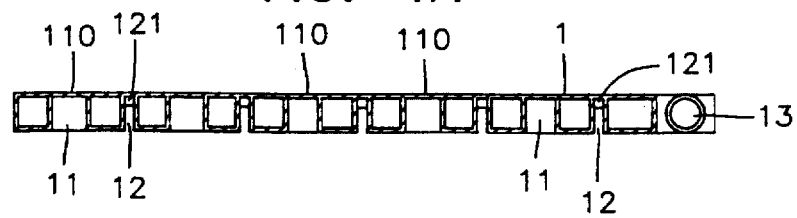
FIG. 4A is a cross-sectional view taken on line 4A—4A of FIG. 4.

The fourth example shown in FIGS. 4 and 4A, comprises a plurality of circular recesses 11 and grooves 12 as the first and the second example do, but additionally at least a hollow tube 13 is attached for an air valve, which may be a one-way valve for adjusting the inner pressure of the shock-absorbing cushion 1 or changing its filling contents.

The fifth example shown in FIGS. 5, 5A and 5B is a shock-absorbing cushion 1 applied to a racket grip, wherein a pre-set end slip 10 is respectively provided at the crosswise ends so as to be glued or sewn together after such cushion 1 envelopes a racket grip. The shock-absorbing cushion 1 can comprise a plurality of the circular recesses 11 and/or grooves 12. If the lower surface is glued on the surface of the grip, the upper surface can give a smooth feeling to a user's hand. A pressure-adjusting component such as an air valve can be additionally attached at the bottom or the two ends of the grip. Both the end slips 10 are glued together with the upper surface to the upper surface if the lower surface is glued on the grip, but the lower surface to the lower surface if the upper surface is glued on the grip. Nevertheless, the upper surface of said slip 10 can be glued with the lower surface according to the necessity or both the slips can be overlapped.

The end slip 10 can be made on one side, two aides, the circumferential edge, partly or intermittently for enveloping the shock-absorbing cushion 1 on an object according to different needs.

FIGS. 6, 6A and 6B show the shock-absorbing cushion 1 applied to a grip and the shock-absorbing cushion is provided with one end slip 10 having through holes 101 for projecting pine 102 at the other end slip to stick in and to be fused together in linking both the end slips 10 after said cushion is enveloped around the grip.

FIGS. 7, 7A, 7B, 7C, 7D and 7E show a cushion 1 applied to the upper section of a shoe counter and FIGS. 8, 8A and 8B show said cushion 1 applied to the lower section of a shoe counter. In these examples, the shock-absorbing cushion 1 can comprise half-through holes 11 and grooves 12 mixed such that said cushion 1 can have the curved surface corresponding to the shape of the object that said cushion 1 is applied to, and can be fixed thereon with help of the end slips 10.

The shock-absorbing cushion 1, having the structure of flexible empty spaces, can be made to become flat, curved cylindrical, arched, spherical or cubic.

Figure 12:
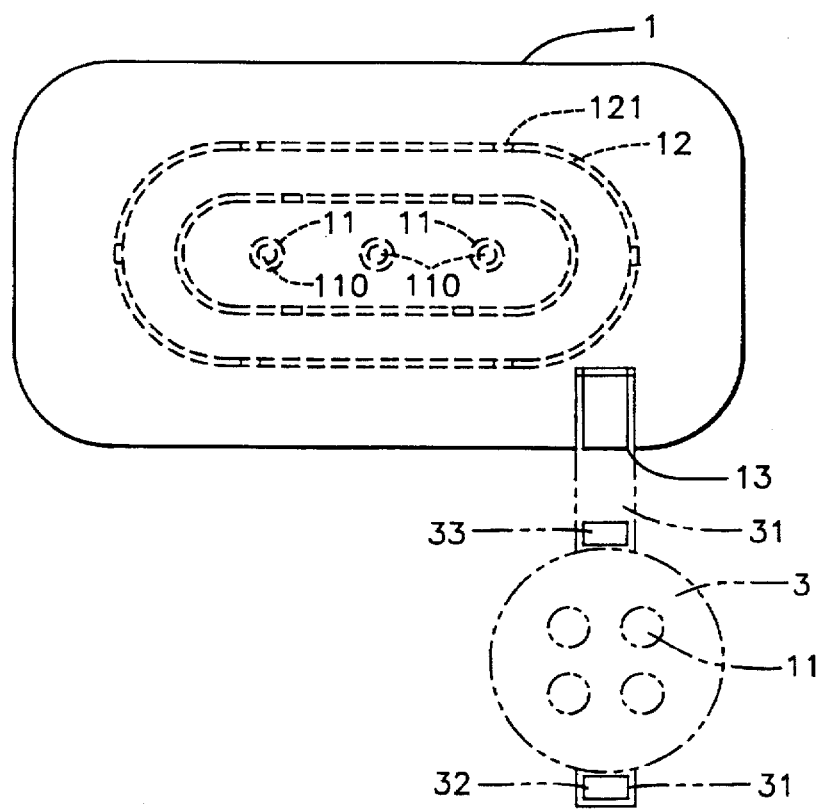
FIG. 12 is a plan view of a twelfth example of shock-absorbing cushion in accordance with the present 12 invention.

The cushion 1 can be provided with a hollow tube 13 for an air valve, a one-way valve, as shown in FIG. 12, for a connecting tube 31 of another air cushion system 3. Also, said hollow tube 13 can be made to extend and contract in its length.

Said air cushion system 3 can be provided with an inlet valve 32 and an outlet valve or a pressure-adjusting valve 33 as shown in FIG. 12 when said system 3 is to be connected with the hollow tube 13 of the shock-absorbing cushion 1. The shape of the air cushion system 3 can be hollow and semi-spherical, square, or extensibly bellow-shaped. The crosswise cross-section of the connecting tube 31 can be round, square or of any geometrical shape, and its lengthwise cross-section can be a slip, saw tooth, corrugated, square-teethed, trapezoidal or triangular.

Figure 9:
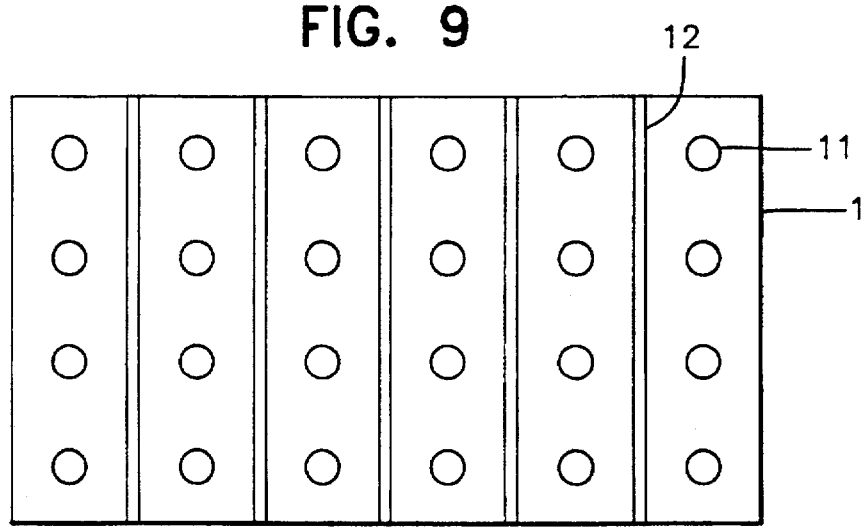
FIG. 9 is a plan view of a ninth example of shock-absorbing cushion in accordance with the present invention.
Figure 9A:
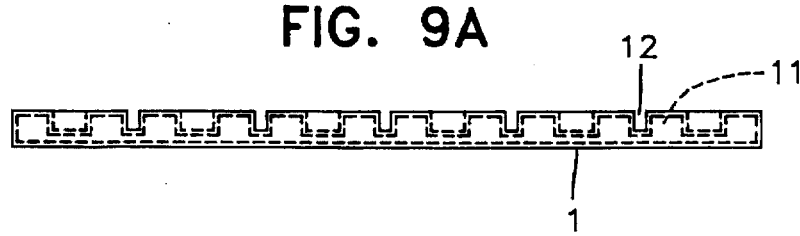
FIG. 9A is a cross-sectional view on line 9A—9A on FIG. 9.

The ninth example shown in FIGS. 9 and 9A is a shock-absorbing cushion 1 comprising circular recesses 11 and grooves 12, and said recesses 11 and grooves 12 are open at the upper sheet and closed at the bottoms and are not linked with but separated from the lower sheet, in other words, the surrounding walls of said recesses 11 and grooves 12 are connected with the upper sheet but not with the lower sheet so that the shock-absorbing cushion 1 has a hollow interior freer to bulge outward, but still possesses a certain inherent supporting force against pressure which can be received from the walls of said vertical holes 11 and grooves 12.

Figure 10:
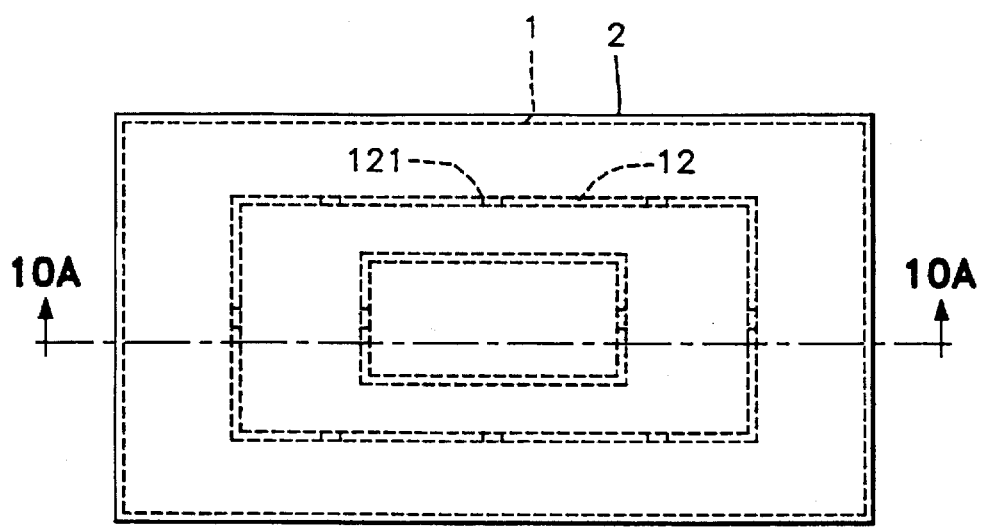
FIG. 10 is a plan view of a tenth example of shock-absorbing cushion in accordance with the present invention.
Figure 10A:
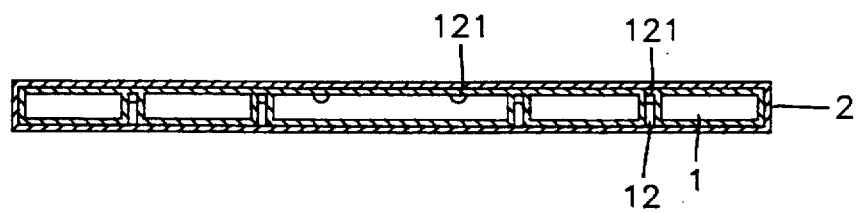
FIG. 10A is a cross-sectional view on line 10A—10A of FIG. 10.
Figure 11:
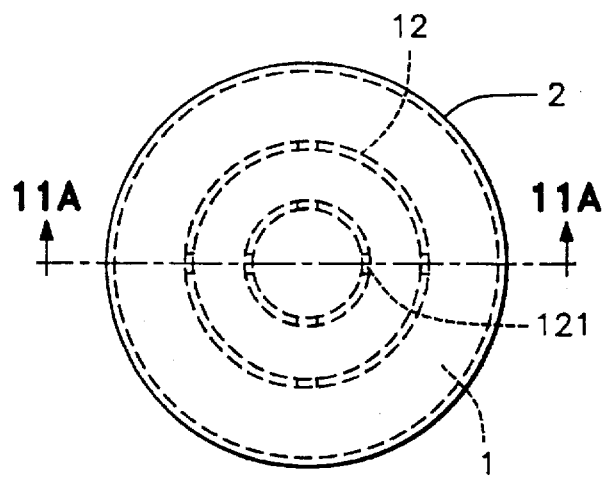
FIG. 11 is a plan view of an eleventh example of shock-absorbing cushion in accordance with the present invention.
Figure 11A:
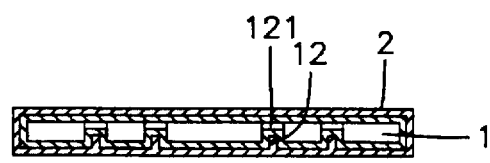
FIG. 11A is a cross-sectional view on line 11A—11A of FIG. 11.

The tenth example shown in FIGS. 10 and 10A is a shock-absorbing cushion 1 comprising a separate outer bag 2 completely surrounding said cushion 1 for protection, and said outer bag 2 can be made of a material transparent, opaque, flexible, elastic, colored or uncolored, foamable or unfoamable. Besides, said outer bag 2 can have openings or not, and the holes 1 and the grooves 12 can be empty or full after said outer bag 2 is formed to surround said shock-absorbing cushion 1.

Figure 13:
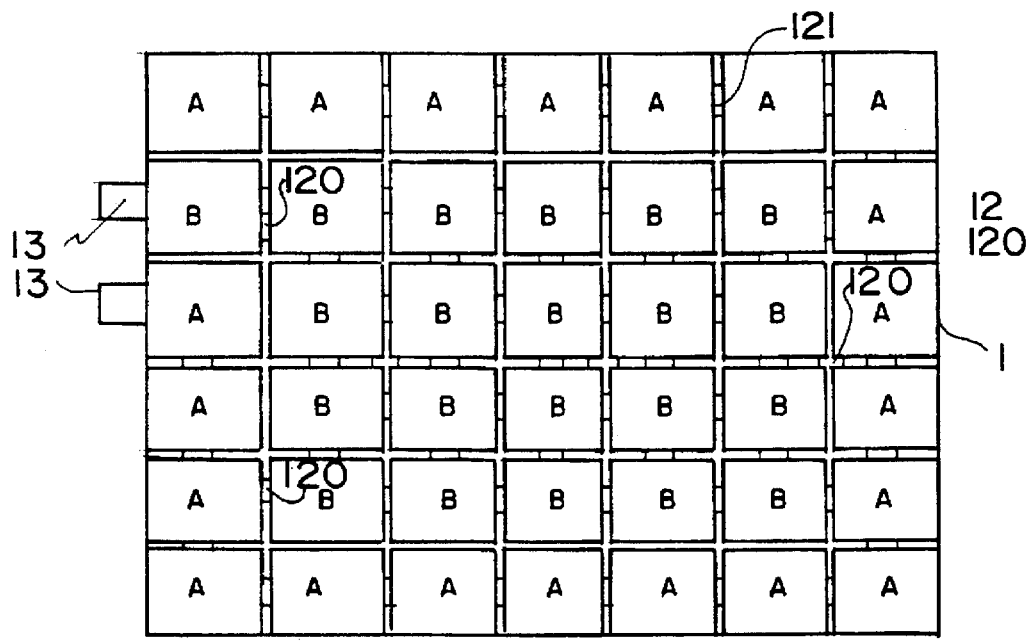
FIG. 13 is a plan view of a thirteenth example of shock-absorbing cushion in accordance with the present invention.
Figure 14:
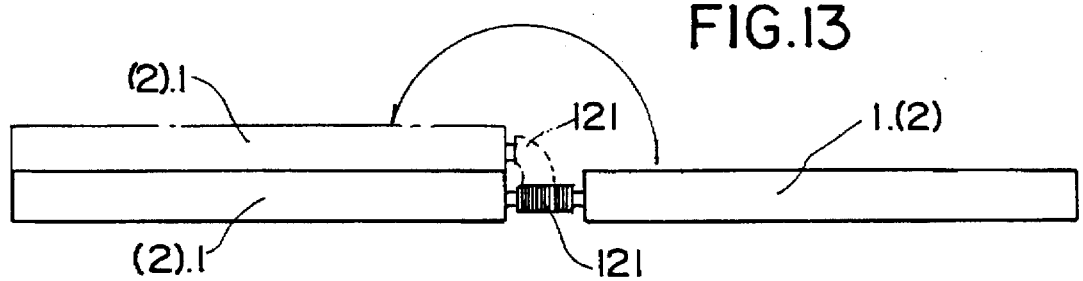
FIG. 14 is a side view of a fourteenth example of shock-absorbing cushion in accordance with the present invention.
Figure 19:
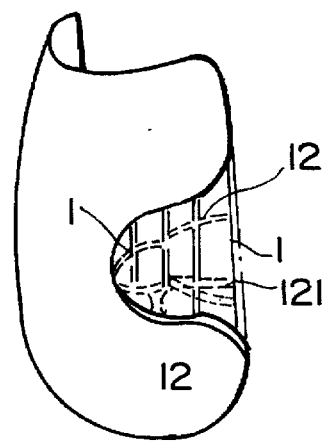
FIG. 19 is a perspective and partly cross-sectional view of a nineteenth example of a shock-absorbing cushion applied to a knee pad.
Figure 15:
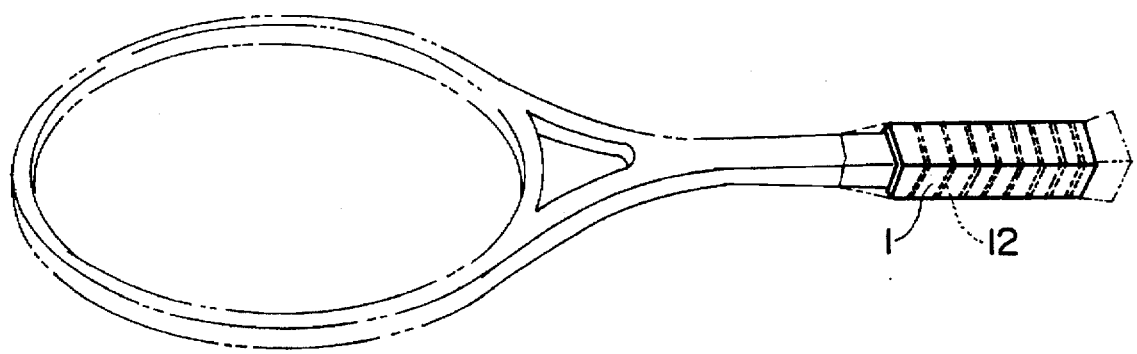
FIG. 15 is a perspective view of a fifteenth example of shock-absorbing cushion applied to a racket grip.
Figure 16:
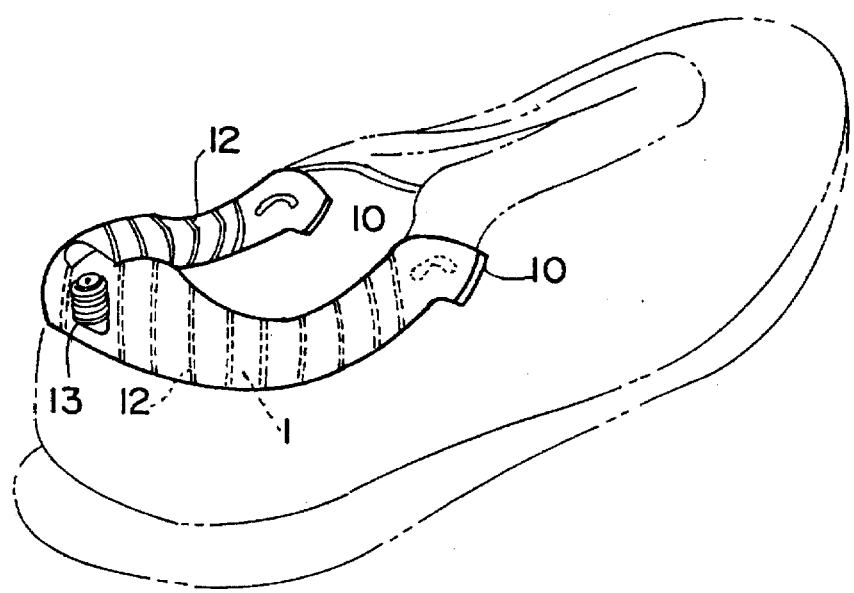
FIG. 16 is a perspective view of a sixteenth example of shock-absorbing cushion in accordance with the present invention.
Figure 17:
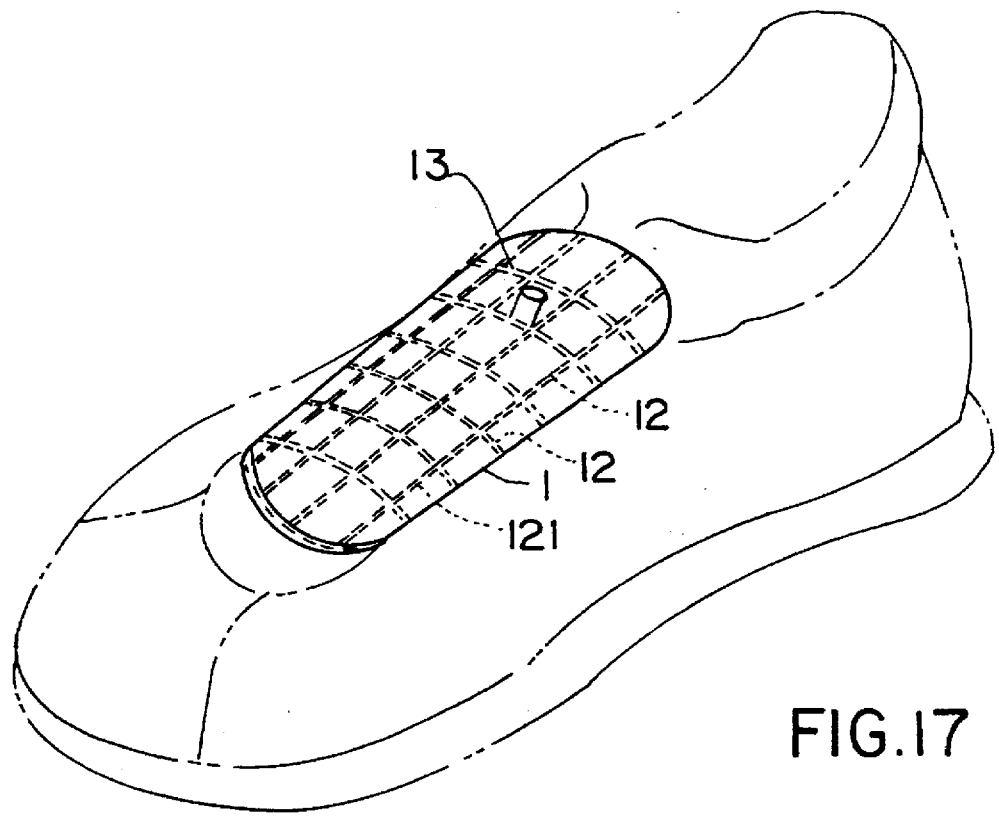
FIG. 17 is a perspective view of a seventeenth example of shock-absorbing cushion applied to a shoe tongue.
Figure 18:
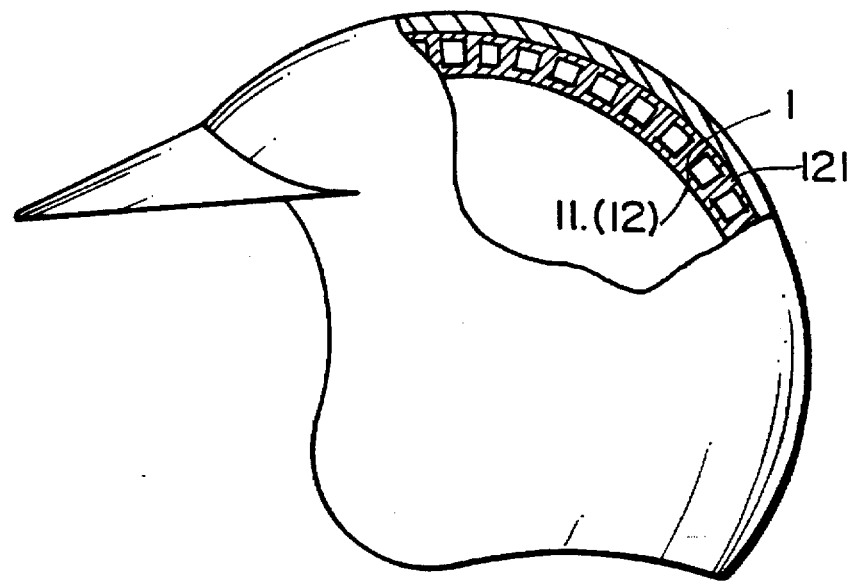
FIG. 18 is a perspective and partly cross-sectional view of an eighteenth example of shock-absorbing cushion applied to a helmet.

The thirteenth example shown in FIG. 13 is a shock-absorbing cushion 1 having one sheet flat and closed and the other recessed at the places where grooves 12 are positioned so that a sealed bag with cubic structure is formed. The grooves 12 define more than one group of air chambers A and B. Said group(s) of air chambers each includes no less than one air chamber and each air chamber belonging to a group has a connecting tube 121 to communicate the air chambers with each other so that the sealed bag body includes more than one group of air chambers communicating with each other. The fourteenth example shown in FIG. 14 includes two units of the shock-absorbing cushion 1 of the thirteenth example connected together with at least one tubal passage 121 having extending and bending flexibility. When one unit of said cushion 1 is bent to overlap the other, the grooves 12 may be made to have such positions as to become face to face, back to back, or not. Said flexible tubal shock-absorbing cushion 1 comprising a separate outer bag 2 completely surrounding said cushion 1 for protection, and said outer bag 2 can be made of a material transparent, opaque, flexible, elastic, colored or uncolored, foamable or unfoamable. Besides, said outer bag 2 can have openings or not, and the holes 1 and the grooves 12 can be empty or full after said outer bag 2 is formed to surround said shock-absorbing cushion 1.

The thirteenth example shown in FIG. 13 is a shock-absorbing cushion 1 having one sheet flat and closed and the other recessed at the places where grooves 12 are positioned so that a sealed bag with cubic structure is formed. The grooves 12 define more than one group of air chambers A and B. Said group(s) of air chambers each includes no less than one air chamber and each air chamber belonging to a group has a connecting tube 121 to communicate the air chambers with each other so that the sealed bag body includes more than one group of air chambers communicating with each other. The fourteenth example shown in FIG. 14 includes two units of the shock-absorbing cushion 1 of the thirteenth example connected together with at least one tubal passage 121 having extending and bending flexibility. When one unit of said cushion 1 is bent to overlap the other, the grooves 12 may be made to have such positions as to become face to face, back to back, or not. Said flexible tubal passage 121 may be a hollow tube having extensible flexibility of may be bellows-shaped.

FIGS. 15–19 show the shock-absorbing cushion 1 applied to different uses. In cases when the circular recesses and the grooves 12 link the upper and the lower sheets by their vertical walls, they have their openings extending from one of the upper or the lower sheet. The other sheet which is totally flat or closed, i.e. without the recesses 11 or the grooves 12 can be provided with apertures 110 or 10 120 as shown in FIG. 4 and FIG. 13.

If a removable inner shoe sole is made to comprise the shock-absorbing cushion 1, said cushion 1 can be made to be inflatable or automatically inflatable or sealed completely.

Figure 20:
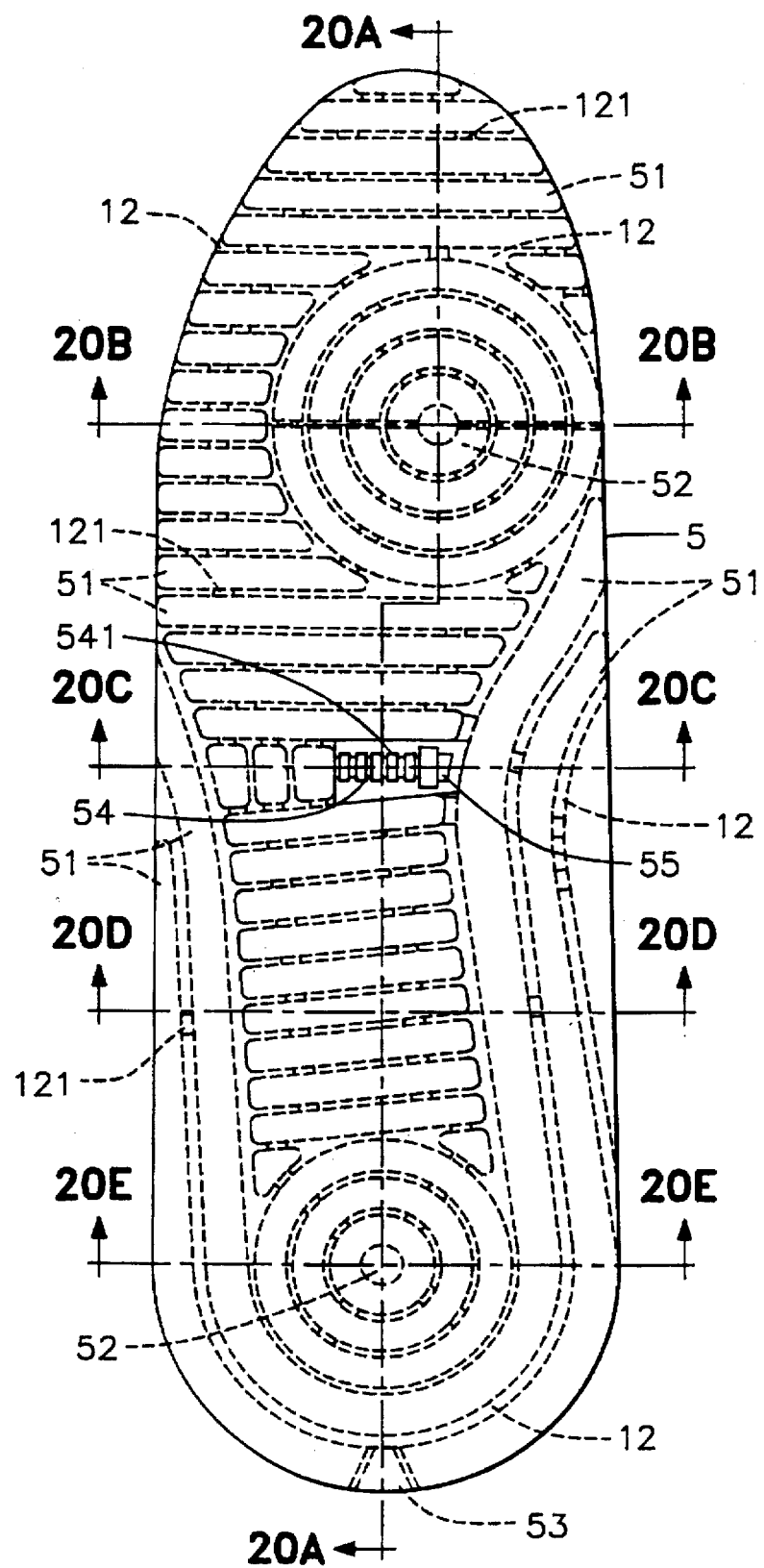
FIG. 20 is a plan view of the twentieth example of the shock-absorbing cushion applied to a shoe sole (1).

FIGS. 20, 20A, 20B, 20C, 20D and 20E show said shoe sole (5) comprising the shock-absorbing cushion 1 being inflatable, having an upper sheet with a flat smooth upper surface of excellent stability, and a lower sheet with grooves 12 whose vertical walls link with the inner surface of the upper sheet. The grooves 12 divide the shoe sole 5 into a plurality of small air chambers 51 of round, triangular, square or any other shape. Each air chamber 51 has a square cross-section such that said chamber 51 can be communicated with each other by a tubal passage formed through the vertical wall surrounding each groove 12 so that the air or liquid in each air chamber can communicate with each other so that the shock or pressure the shoe sole receives can be spread all over the air chambers. Besides, the shoe sole 5 has a group of small circular air chambers 52 having the same center at the thumb and the heel section so as to give fine stability to the thumb and the heel by means of the good radial flexibility and the fine symmetry of both groups of air chambers 52. Said small air chambers 52 are separated by the vertical walls of the grooves 12 and communicate with each with the tubal passage 121. The shoe sole 5 also has the right and the left middle sections to the heel section provided with lengthwise grooves 12 so as to give flexibility to these sections so that the rear part of the shoe can be bent up. The air chambers 51 at the outer edge of the heel can be made in two ways. One way is, as shown in FIG. 20, an independent air chamber 53 not communicating with the other chambers 51, does not need to be bent up when the sole 5 is put in a rather large size of a shoe, still having a certain inherent supporting force to absorb pressure or shock, and can be cut off to enable the rear end to bend up when the sole 5 is put in a small shoe.

Figure 23:
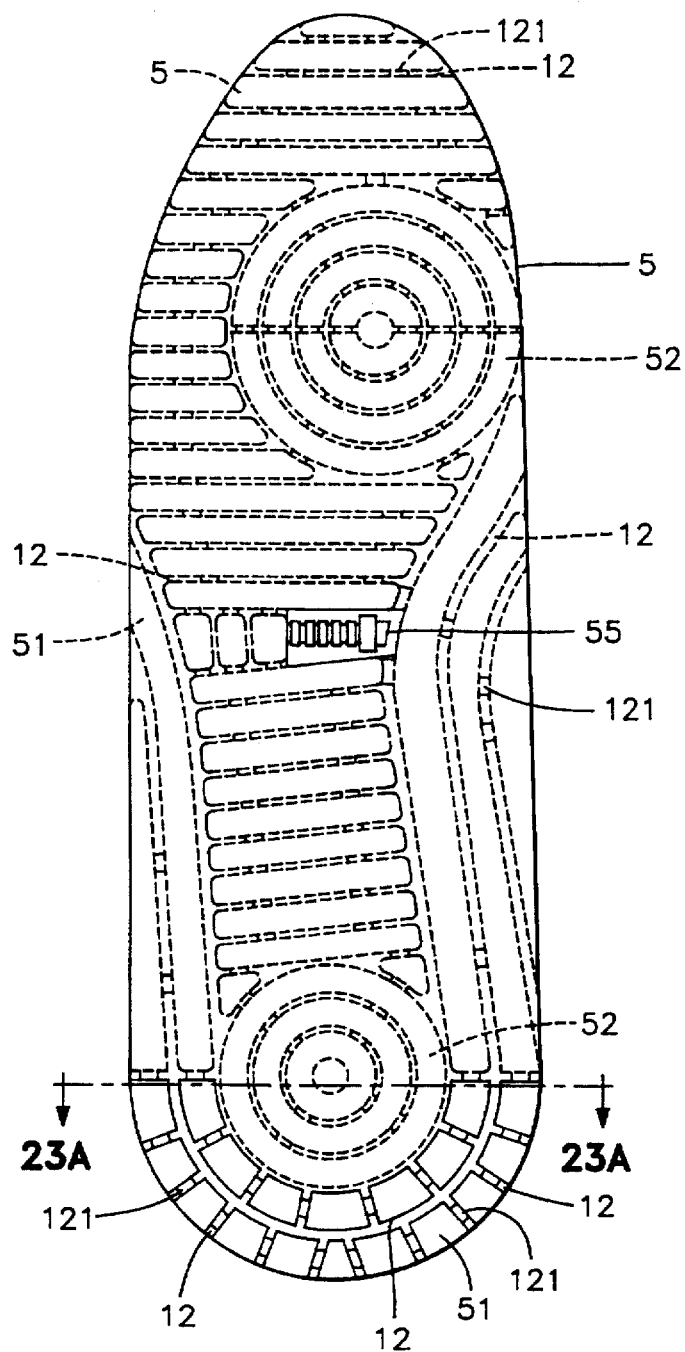
FIG. 23 is a plan view of a twenty-third example of a shock-absorbing cushion applied to a shoe sole (3).
Figure 23A:
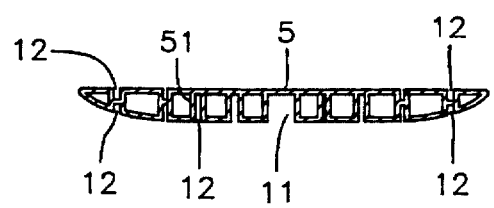
FIG. 23A is a cross-sectional view on line 23A—23A of FIG. 23.

The other way is shown in FIGS. 23 and 23A, wherein the two curved groups of the air chambers 51 are provided, abutting on the circular groups of air chambers 52 along the heel edge, and the grooves 12 are set at both sheets. Besides, the air chambers 51 are connected and communicate with each other and with a tubal passage 121 so that the whole group of air chambers function as an extensible tube because of the empty spaces of the grooves, which is to shrink when the heel is bent up.

Figure 24:
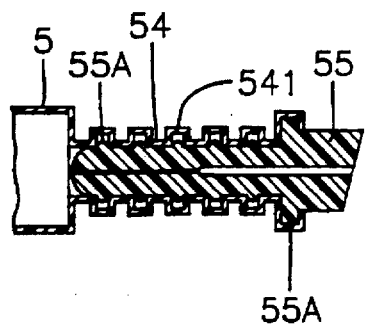
FIG. 24 is a cross-sectional view of a hollow tube combined with an air valve in accordance with the present invention.
Figure 25:
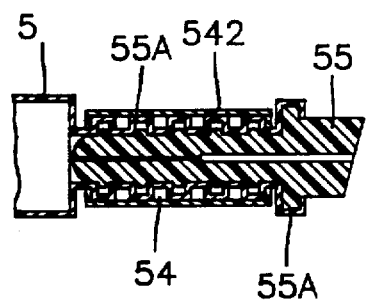
FIG. 25 is a cross-sectional view of a hollow tube attached with an anti-burst tube in accordance with the present invention.

The removable inner shoe sole 5 can be provided with a hollow tube 54 at any air chamber 51 at the inner middle section and said hollow tube 54 has its cross-section shaped corrugated or saw-toothed as shown in FIG. 24, provided with several rounds of circumferential grooves 541 to combine with an inflating valve 55 to increase preventing force against leakage from both 54 and 55. The inflating valve also has no less than one circumferential ridge 55 to engage with the groove 541 to make the inflating valve 55 not fall off the tube 54, and thereby accidental pulling said valve 55 off the tube 54 can be prevented. Besides, an anti-burst tube 54 can be additionally augmented around the tube 54 as shown in FIG. 25.

The material for the removable inner shoe sole 5 can be (1) polyurethane, which is resistant to air penetration but easily permeated by water vapor or (2) one that can be permeated by both air and water vapor. In the shoe sole 5 the material 1 is used in, the water vapor will enter the shoe sole 5 when the pressure of the water vapor in the shoe coming from the sweat of a foot becomes larger than that in the shoe sole 5. As the pressure in the shoe sole 5 increases, for example, to about 25 psi, greater than that of the interior of the shoe, 14.7 psi, the vapor in the shoe sole 5 will form drops to be stored therein. After the shoe is taken off by a user, the water vapor in the shoe sole 5 will gradually percolate out in the open air until all the water vapor disappears. The fine vapor absorbing property is tantamount to a sweat absorbing effect, so the shoe sole 5 has the function of preventing foot odor. Said effect can not only be proved by the information from the material factory, but also by practical use of the shoe sole 5 in a shoe. It is proved that the shoe sole 5 taken out of the shoe after being worn for a day or 4–5 hours were found to contain water drops but said water drops automatically evaporated out of the sole 5 in time.

If the material 2 is used in the shoe sole 5, the hollow interior of the shoe sole 5 can be filled with air, water, other gas or liquid having the property of heat-preserving or cooling to give the shoe the effect of preserving warmth or coolness.

Figure 22:
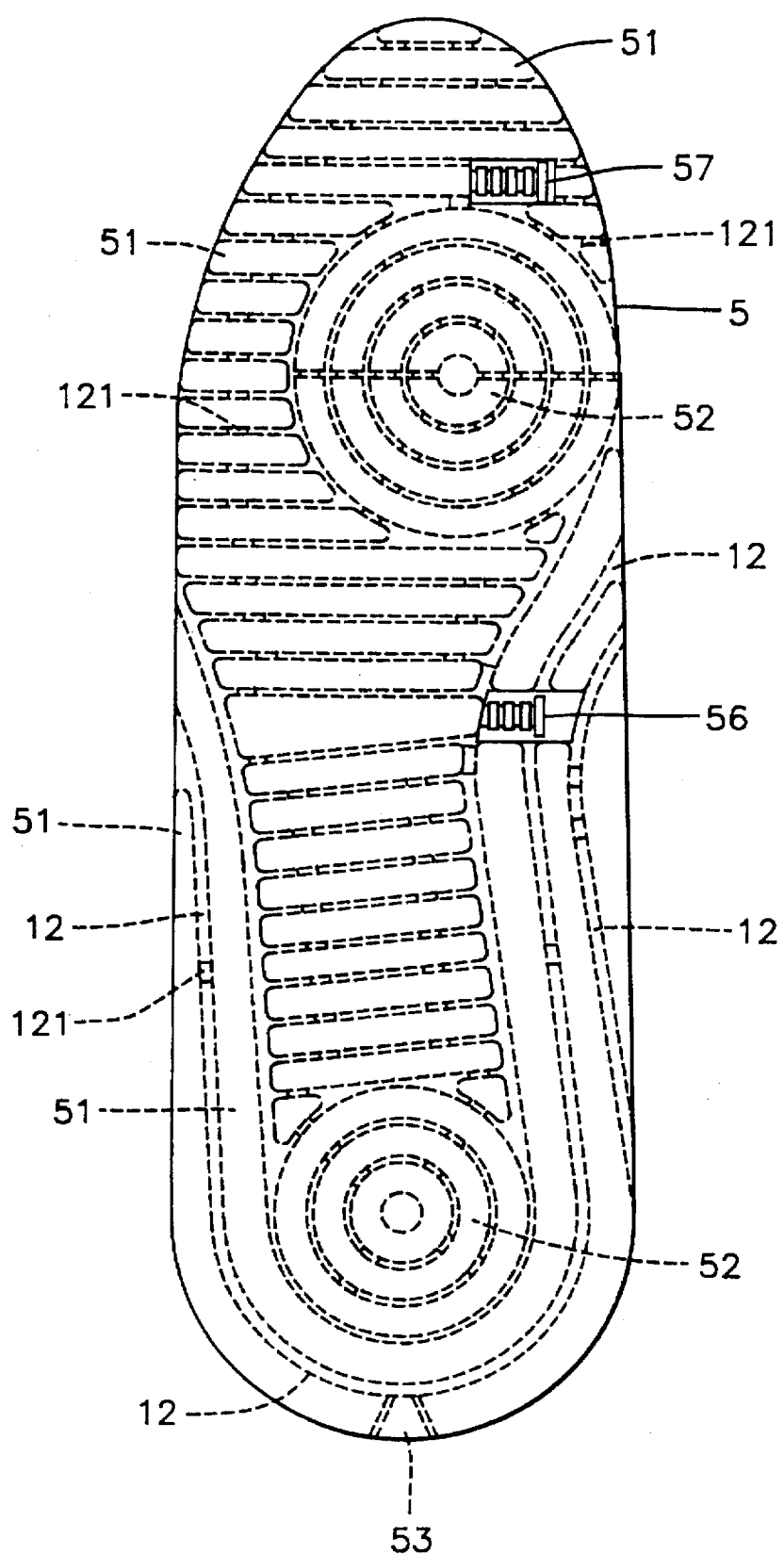
FIG. 22 is a plan view of a twenty-second example of shock-absorbing cushion applied to a shoe sole (2).

FIG. 22 shows an automatic inflating removable inner shoe sole 5 provided with an inlet valve 56 and an outlet valve 57 communicating with the interior at the thumb section. Therefore, this shoe sole 5 can suck air into the interior through said valve 56 and exhaust the air from the interior through said valve 57 by walking or running action function to a foot sole by means of the openings of the grooves 12 and recesses 11. Besides, this removable shoe to press the shoe down on the ground and to release it from the ground. Then, this shoe sole 5 not only has its inherent supporting force against shock or pressure, but also the function to circulate the air around in its interior to the exterior when the user walks wearing the shoes.

Figure 26:
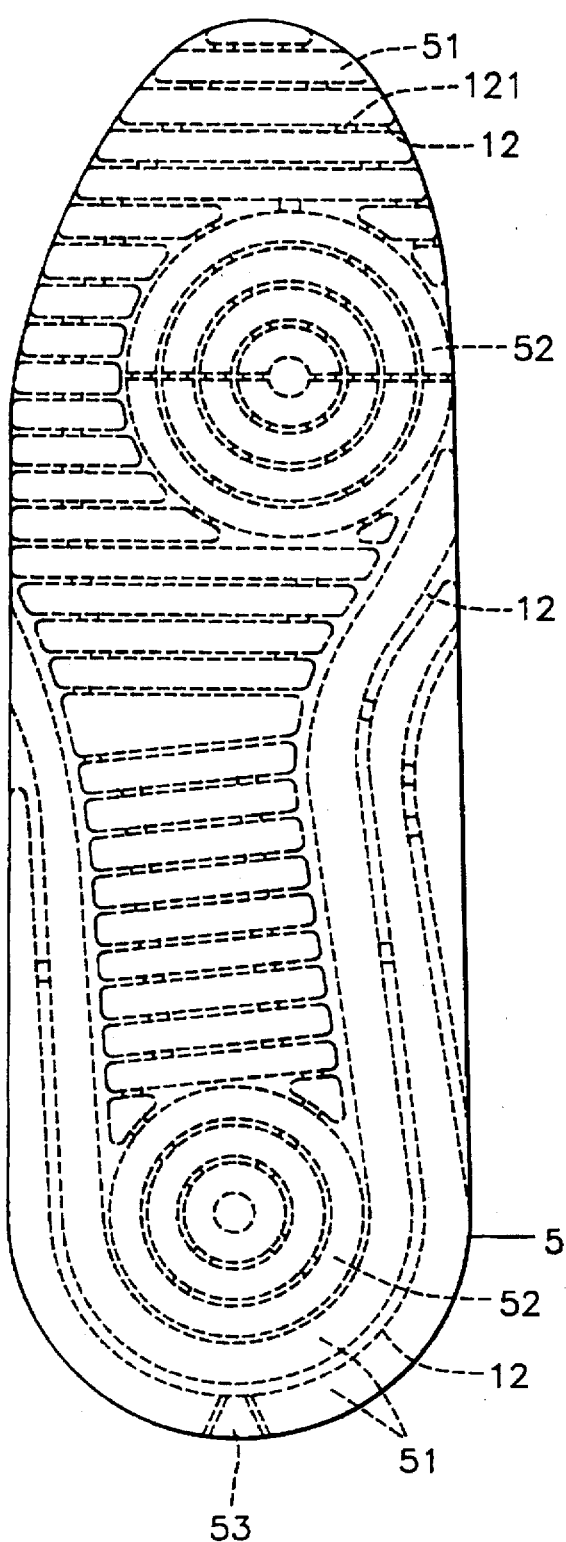
FIG. 26 is a plan view of a shoe sole (4) provided with a shock-absorbing cushion in accordance with the present invention.

The hollow interior of the shoe sole provided with the shock-absorbing cushion 1 can be totally sealed as shown in FIG. 26 to make the inner pressure equal to the atmospheric pressure based on the principle $P1V1=P2V2=NRT$. Then this shoe sole can possess the shock-absorbing elasticity produced by compressed dimension of the air in the interior when it receives pressure or shock.

As the shoe sole 5 can be provided with the shock absorbing cushion 1 comprising the vertical grooves 12 or recesses 11 communicating with one another such that the sole 5 has a similar function as a pump to circulate the air in the grooves 12 or recesses 11 by means of shrinking and recovering action of the sole 5.

If the shoe sole 5 is provided with the flat smooth upper surface and the lower surface with the openings of the grooves 12 or recesses 11, it is to be put in a shoe with the upper surface up for exercise and with the lower surface up for health, as said lower surface has a massage function to a foot sole by means of the openings of the grooves 12 and recesses 11. Besides, this removable shoe sole 5 can be applied to any shoe.

Figure 27:
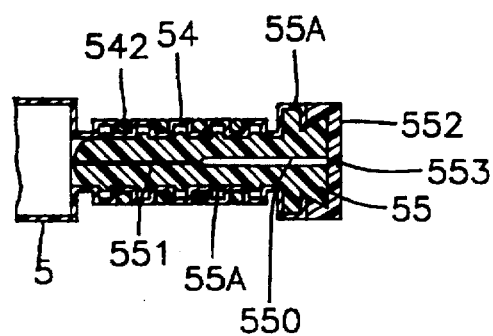
FIG. 27 is a cross-sectional view of an air valve 14 covered with an anti-dirt cap in accordance with the present invention.
Figure 28:
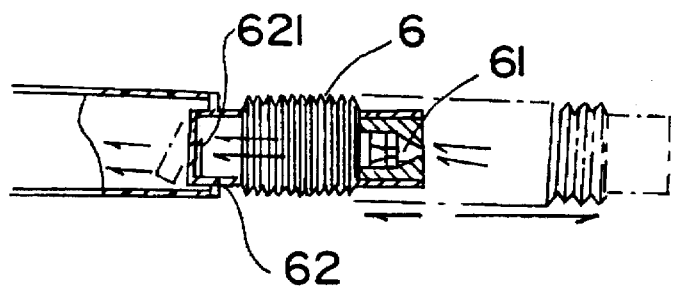
FIG. 28 is a cross-sectional view of a one-way valve attached with a pump to be combined with a shock-absorbing cushion in accordance with the present invention.
Figure 29:
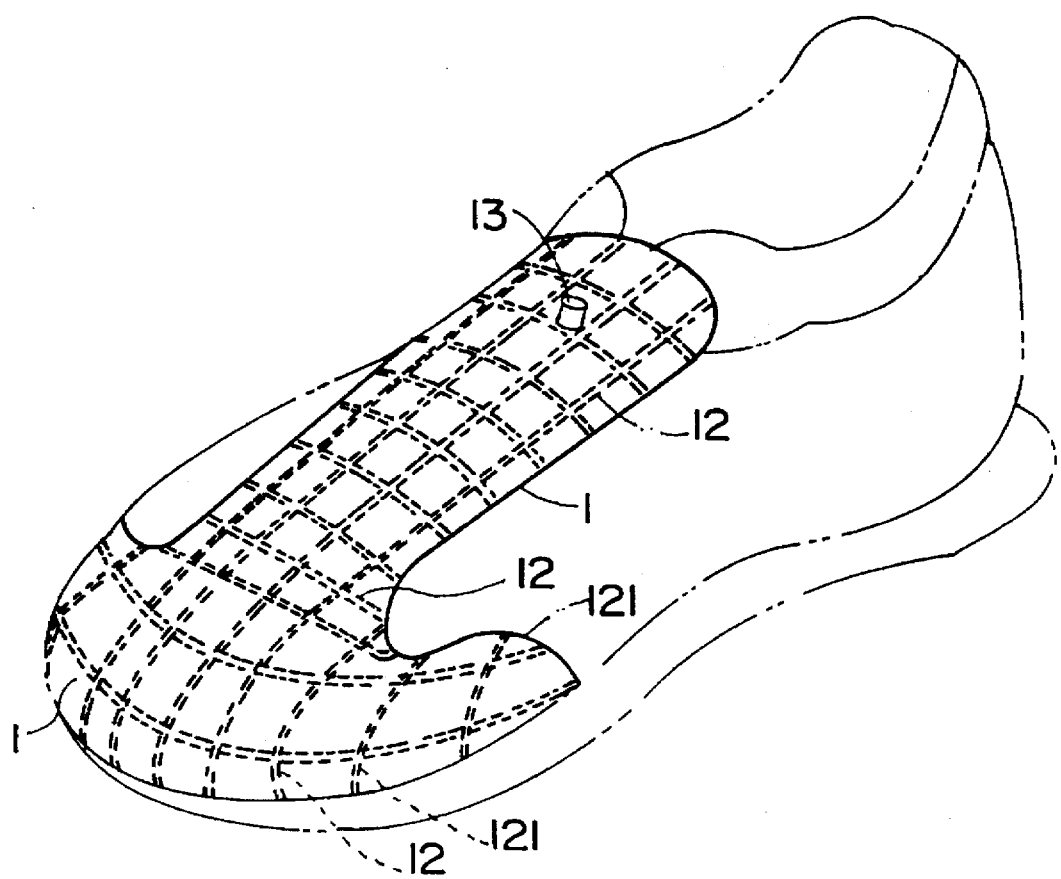
FIG. 29 is a perspective view of a shock-absorbing cushion applied to a shoe tongue extending to the shoe tip.

In addition, if the removable shoe sole 5 is provided with a soft rubber air valve 55 shown in FIG. 27, the air valve 55 can be covered with an anti-dirt cap 552 having a through hole 553 communicating with a needle hole 550 in the valve 55 with lubricating oil stored therein so that an air needle has to go through the lubricating oil before it goes through the cut 551 in the air valve, without harming the cut 551 to the result of air leakage.

The shoe sole 5 comprising this shock-absorbing cushion 1 described above has the following features and effects.

FIGS. 30 to 33 show a shock absorbing cushion again in the form of an insole 5 for a shoe or other footwear having a like structure to the insole shown in FIG. 23 insofar as the insole is molded to provide a flat upper sheet and a lower recessed sheet, with the sheets sealed along the peripheral edge and the recesses in the lower sheet defining a series of internal air chambers 51, 52, for example, interconnected by tubular passages 121. An inflation valve 55, as previously disclosed, is again provided.

In this embodiment, the interior chambers of the air cushion are filled with a flowable substance, indicated by stippling, and which may comprises a powder, a liquid, or a gas. Fragrant or medicated, e.g., anti-fungal, substances may be used. The flowable substance may, for example, be introduced through the inflation valve, such as by a syringe and needle, so that the cushion can also be refilled. Alternatively, and if no inflation valve is provided, the flowable substance can be introduced when the air cushion is molded.

The purpose of the flowable substance is for circulation through a user's shoe; for example for medicinal treatment or deodorizing purposes. To this end, the upper sheet of the air cushion is provided, in selected areas, with pin holes 140 for release of the flowable substance by a pumping action produced by alternating pressure application to the cushion by a user's heel and toes during walking. In order to optimize the pumping effect, the location and density of the pin holes may be varied throughout the area of the shoe cushion. Thus, the pin holes may have maximum density in the arch area of the cushion and minimum density, or even a complete absence of pin holes in the heel and toe areas.

Figure 32:
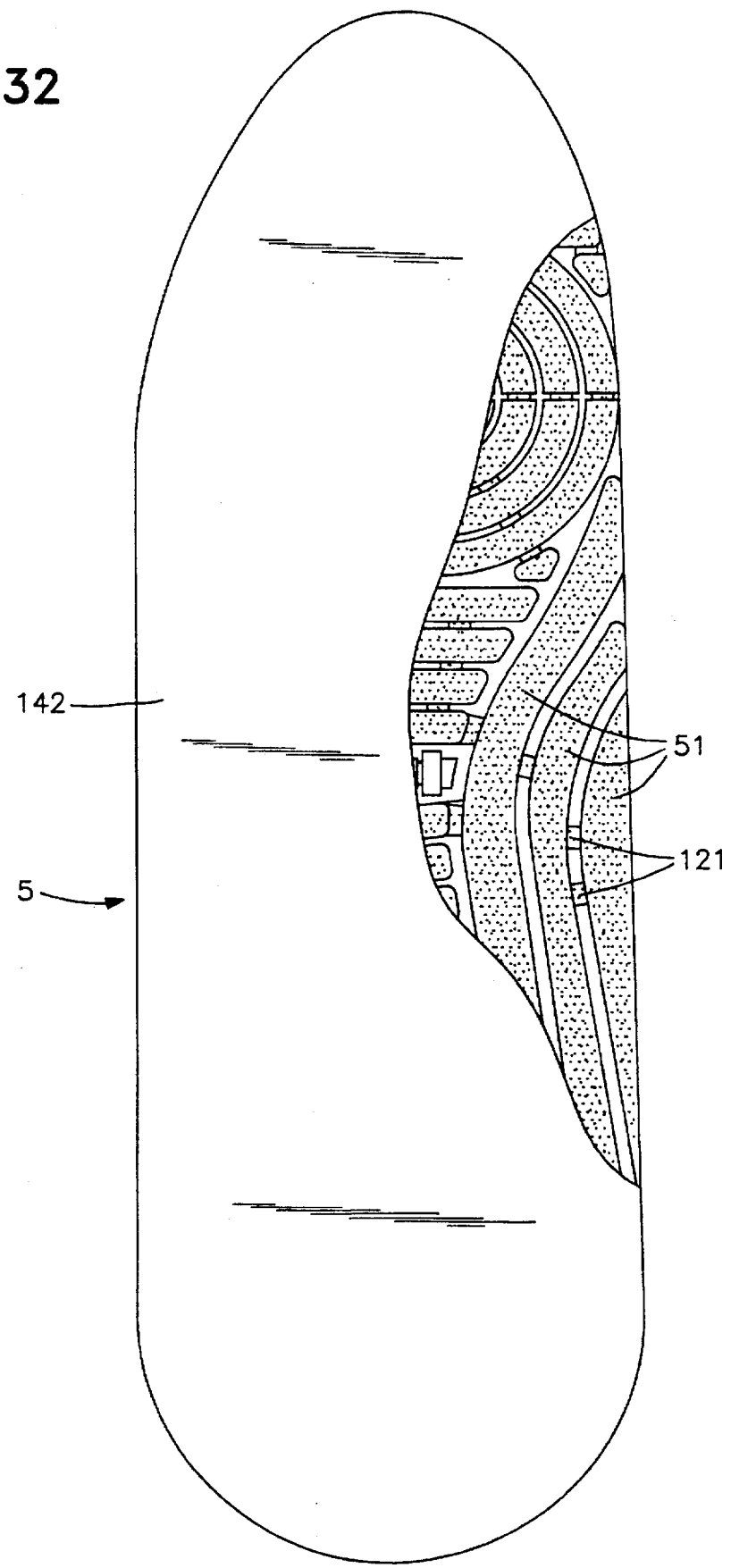
FIG. 32 is a plan view of the cushion shown in FIG. 30 covered with a fabric liner.
Figure 33:
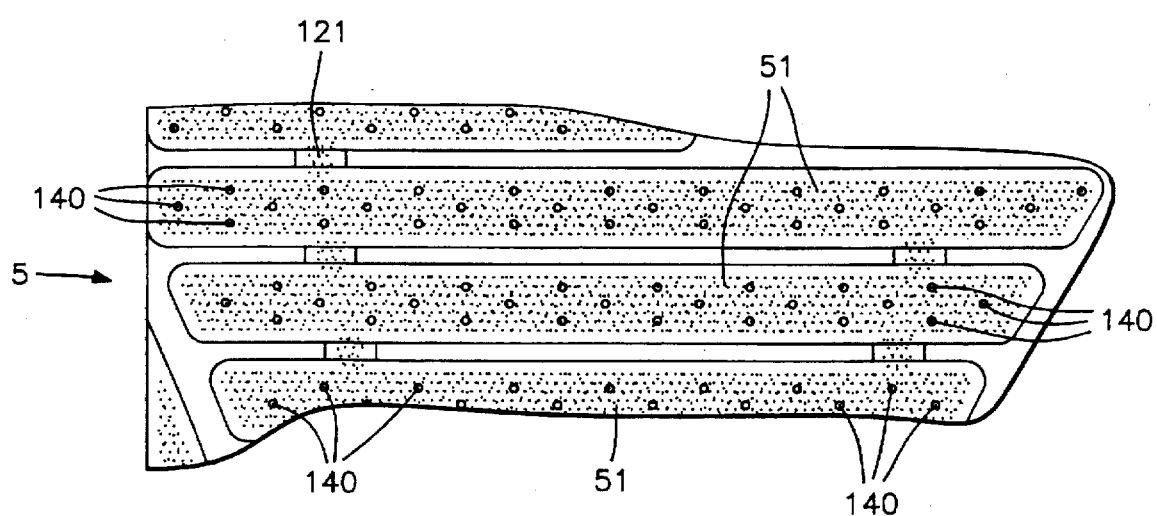
FIG. 33 is an enlarged plan view of a part of the cushion shown in FIG. 30.

As shown in FIG. 32, the upper surface of the cushion may be covered with an adherent layer of porous and absorptive fabric 142 as commonly used for insoles and which allows passage of the flowable substance.

Figure 30:
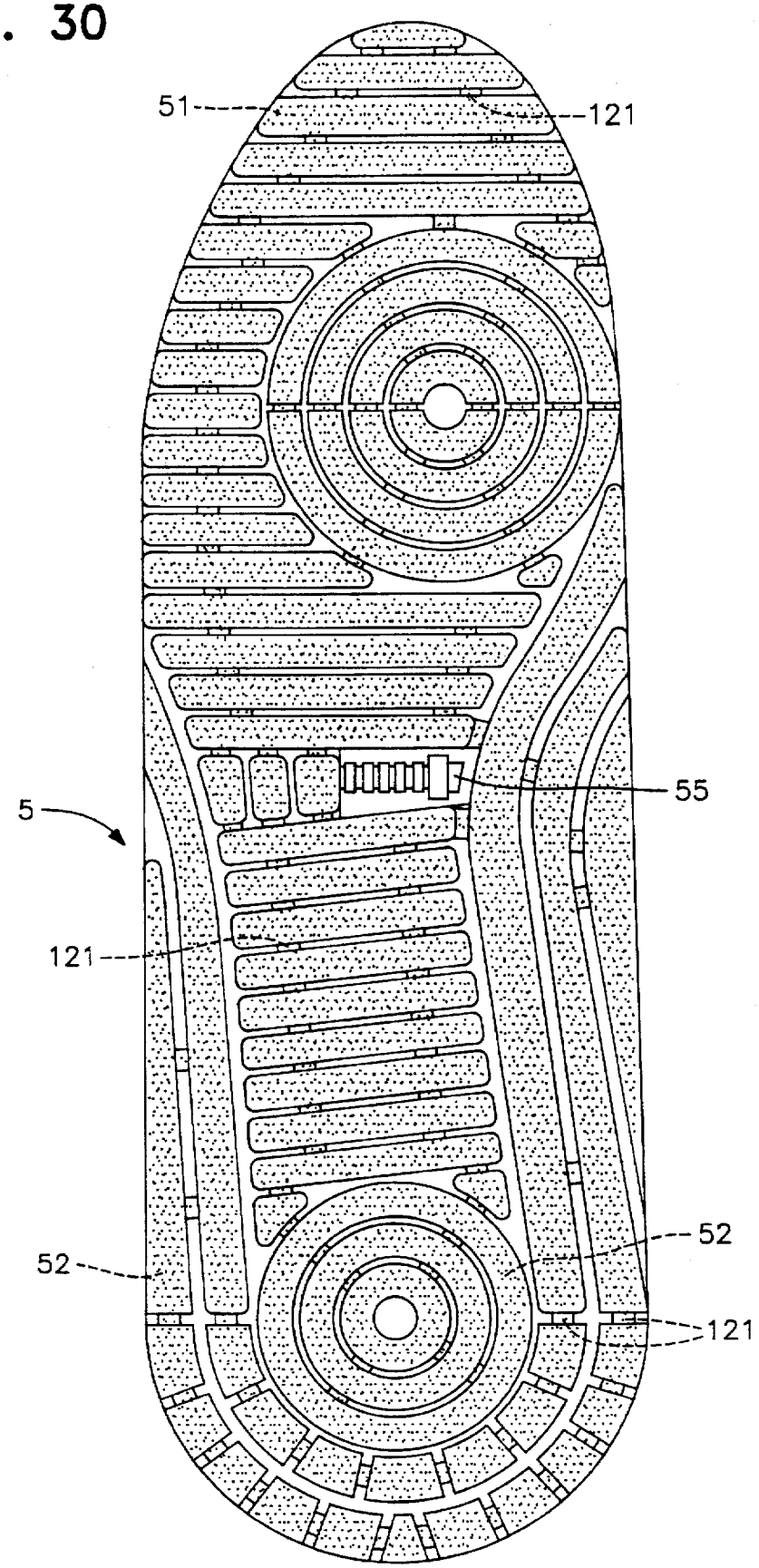
FIG. 30 is a plan view of another shock absorbing cushion according to the invention in the form of a shoe insole similar to the one shown in FIG. 23.
Figure 31:
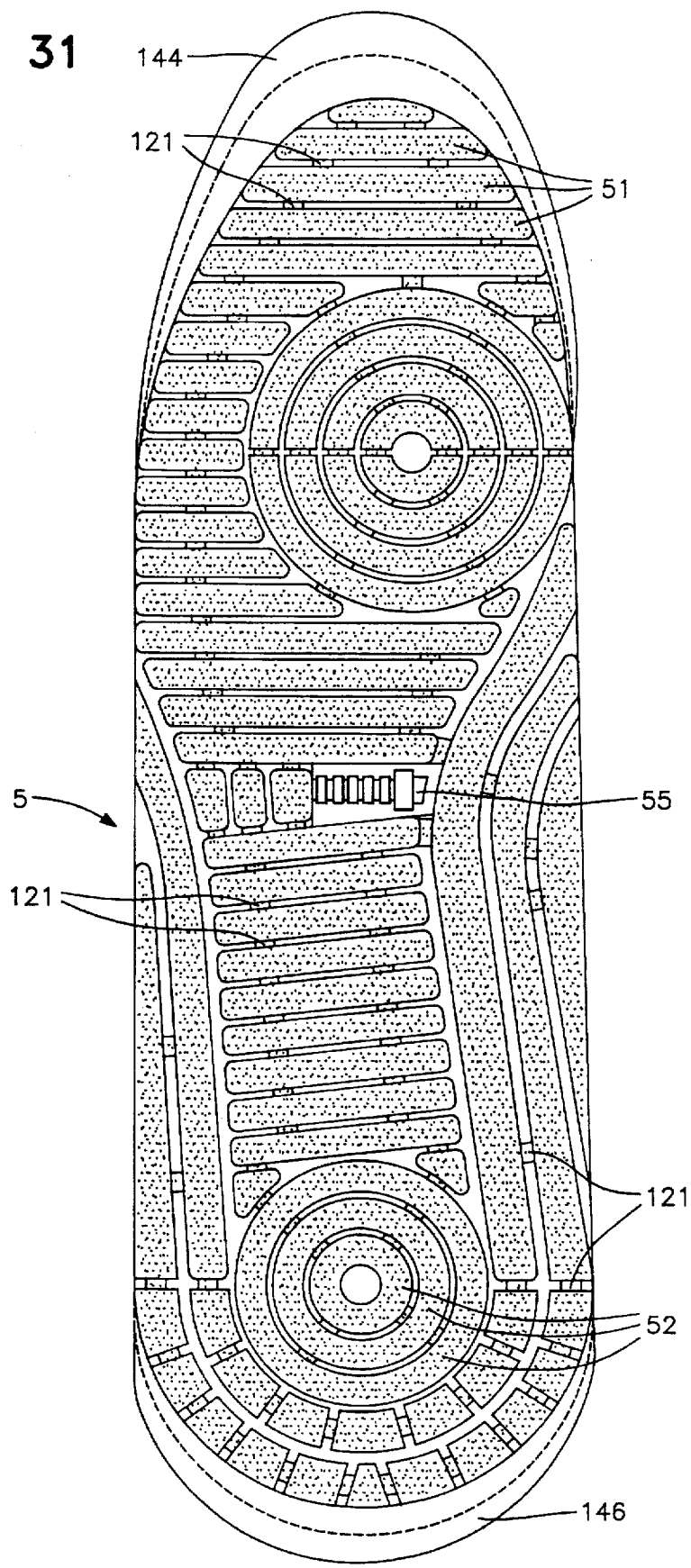
FIG. 31 is a plan view of the shock absorbing cushion shown in 30 prior to a manufacturing step which trims the cushion to size.

FIG. 31 illustrates a technique whereby a molded cushion structure according to the invention can be adapted to make different size shoe insoles to fit in different size shoes. Initially, the shoe cushion is molded, as previously described with a separate air chamber 144 or 146 at the toe end or heel end respectively, or at each end. The separate air chambers 144, 146 do not communicate internally with the remaining air chambers 51, 52. The cushion with the entire air chamber 144 or 146 (or both) in tact is sized to fit the largest shoe size or a range. For smaller sizes varying amounts of the toe and/or heel chambers, represented by the dotted lines, can be cut away and peripherally sealed at the factory. Alternatively, the largest size cushion can be supplied to customers and the dotted lines can represent sealed and perforated cut-away or tear-away portions, whereby the customer can select the required cushion size and remove the relevant amount of the chambers 144, 146. While only a single dotted line is shown in the drawings for each chamber, there may be multiple tear-away portions to fit different shoe sizes. Clearly, in this system, the cushion shown in FIGS. 30 and 32 represents the smallest shoe size in the range wherein chambers 144 and 146 have been removed in their entirety. This sizing technique is also applicable to the preceding embodiments which do not incorporate a flowable substance in the air cushion, and to other insole structures.

Figure 34:
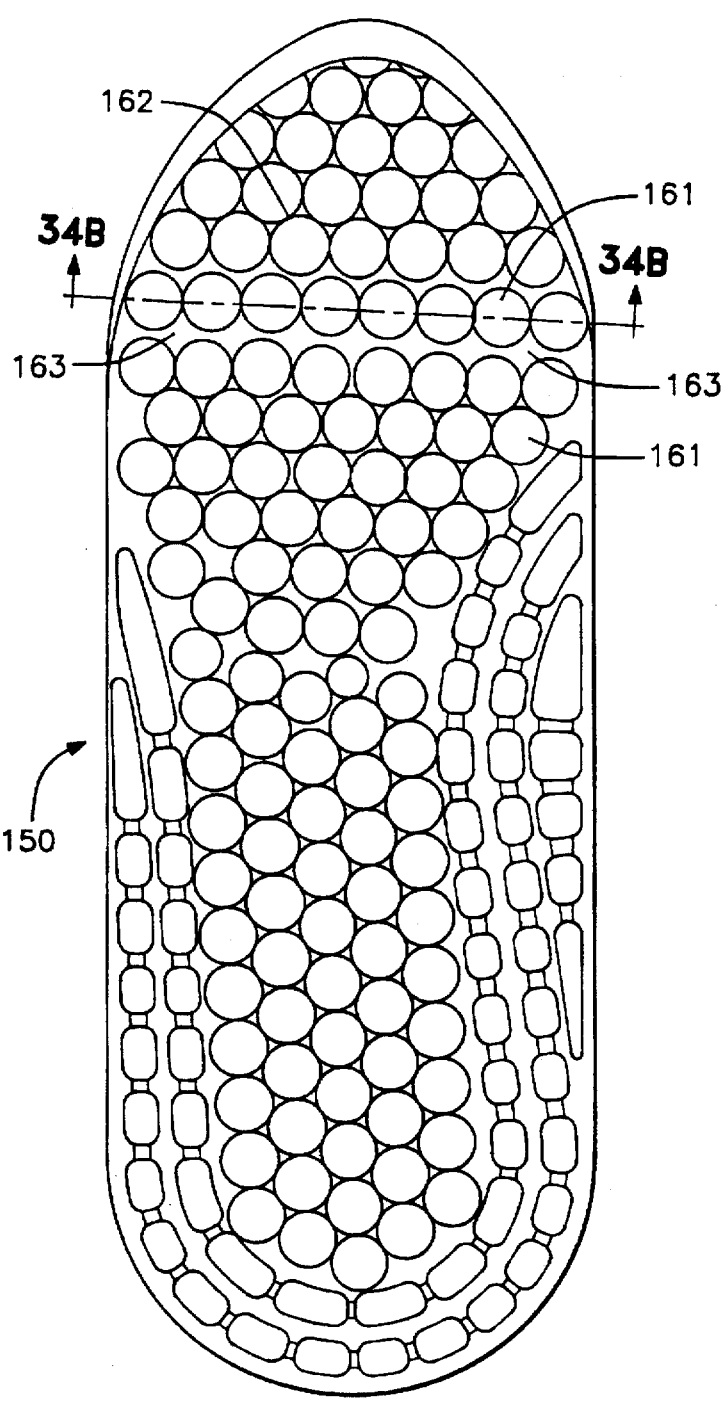
FIGS. 34, 34A and 34B are a plan view, an elevational view and a sectional view on line 34B—34B, respectively, of another air cushion insole.
Figure 34A:
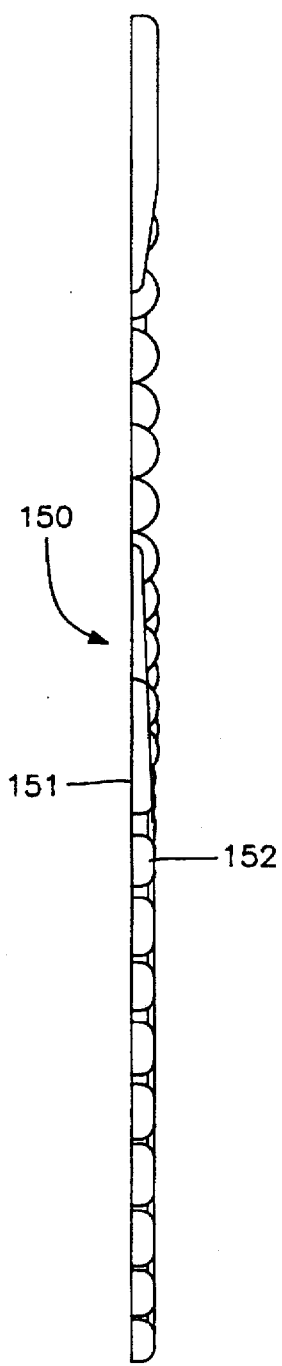
Figure 34B:
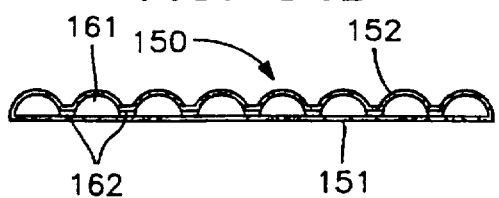
Figure 40:
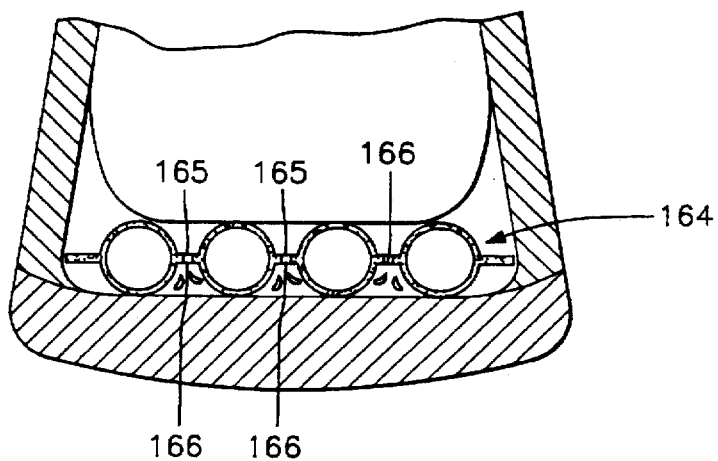
FIG. 40 is a cross-sectional view through a shoe with an incorporated air cushion insole according to the invention.

FIGS. 34-34B show another air cushion insole 150 formed of a flat lower sheet 151 and a dimpled upper sheet 152 which are again sealed around the periphery. The sheets define on the top surface of the air cushion hemispherical internal air chambers 161 connected by tubular sections 162 and flattened areas or depressions 163 between the air chambers. The bottom of the cushion is flat. The air cushion can be used in a shoe with either surface facing upwards and when the dimpled surface faces upward, it provides an enhanced massaging effect to the foot. A modification is shown in FIG. 40 where both surfaces of insole 164 are dimpled.

In either case, powdered material can be spread on the flattened areas 163 or 165 between the air chambers for sterilization, deodorization or dehumidification. The depressions can in either case be perforated with punctures 166 (FIG. 40) to enhance air circulation. Because the hemisphers provide spaced contact points with a wearers foot, with decreasing and increasing pressure points during walking, air circulation is enhanced and the plastic insole can be used without a fabric cover.

FIGS. 35-35B show an insole 165 similar to insole 150 but showing an area 166 which has been entirely removed (and sealed around the periphery), for example, to receive and protect a wound in the foot.

Figure 36:
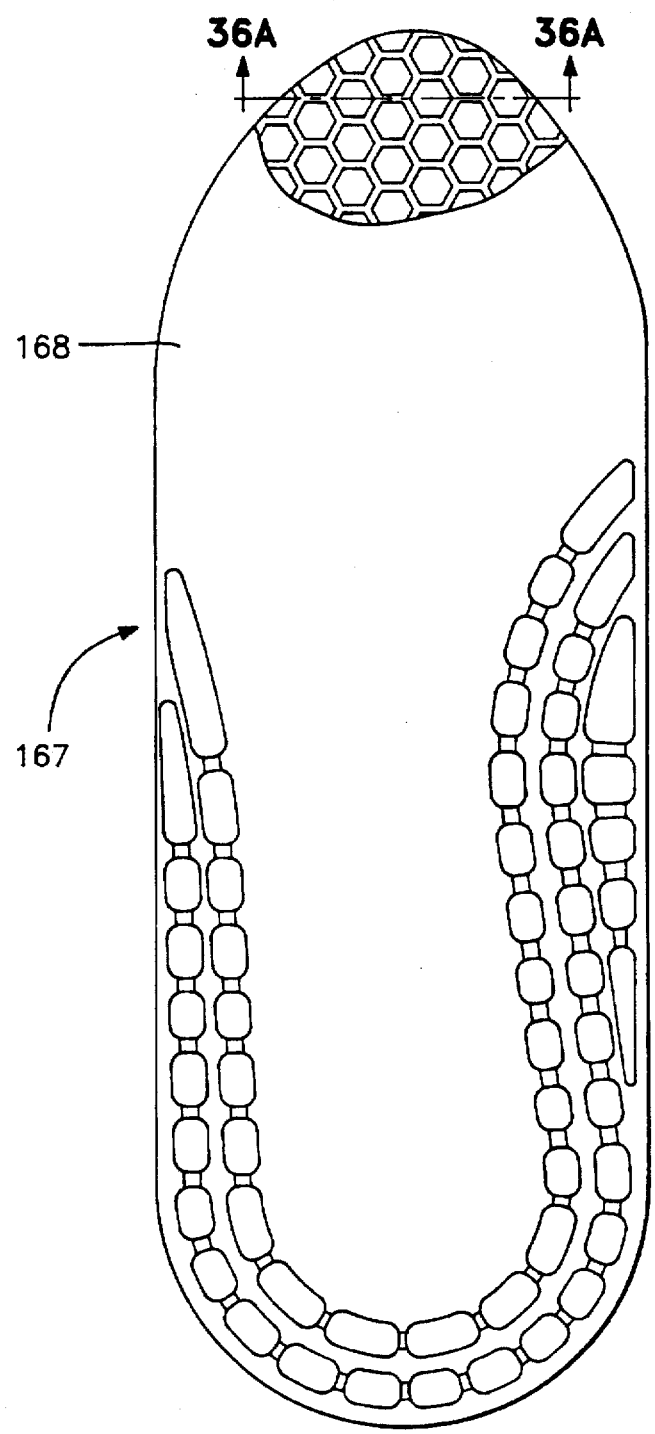
FIGS. 36 and 36A are respectively a plan view, part broken away, and a sectional view on line 36—36 of yet another air cushion insole.
Figure 36A:
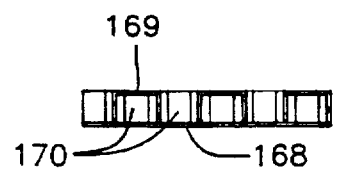

FIGS. 36 and 36A show a similar insole 167 formed from a flat lower sheet 168 and a dimpled upper sheet 169 wherein the air chambers 170 are hexagonally shaped rather than hemispherical.

FIGS. 37-37F show another similar air cushion insole 171 in which the area under the ball of the foot has spherical air chambers 172 formed by hemispherical dimples in both the top and bottom sheets. As previously, the chamber are interconnected by tubular ducts and in this case, the insole includes unidirectional air inlet and outlet valves 173, 174 to improve air circulation around a wearers foot by a pumping action caused by walking whereby air is drawn into the air chambers through valve 173 and expelled through valve 174. The valves are one-way flap-valve structures molded integrally with the upper and lower sheets.

Figure 38:
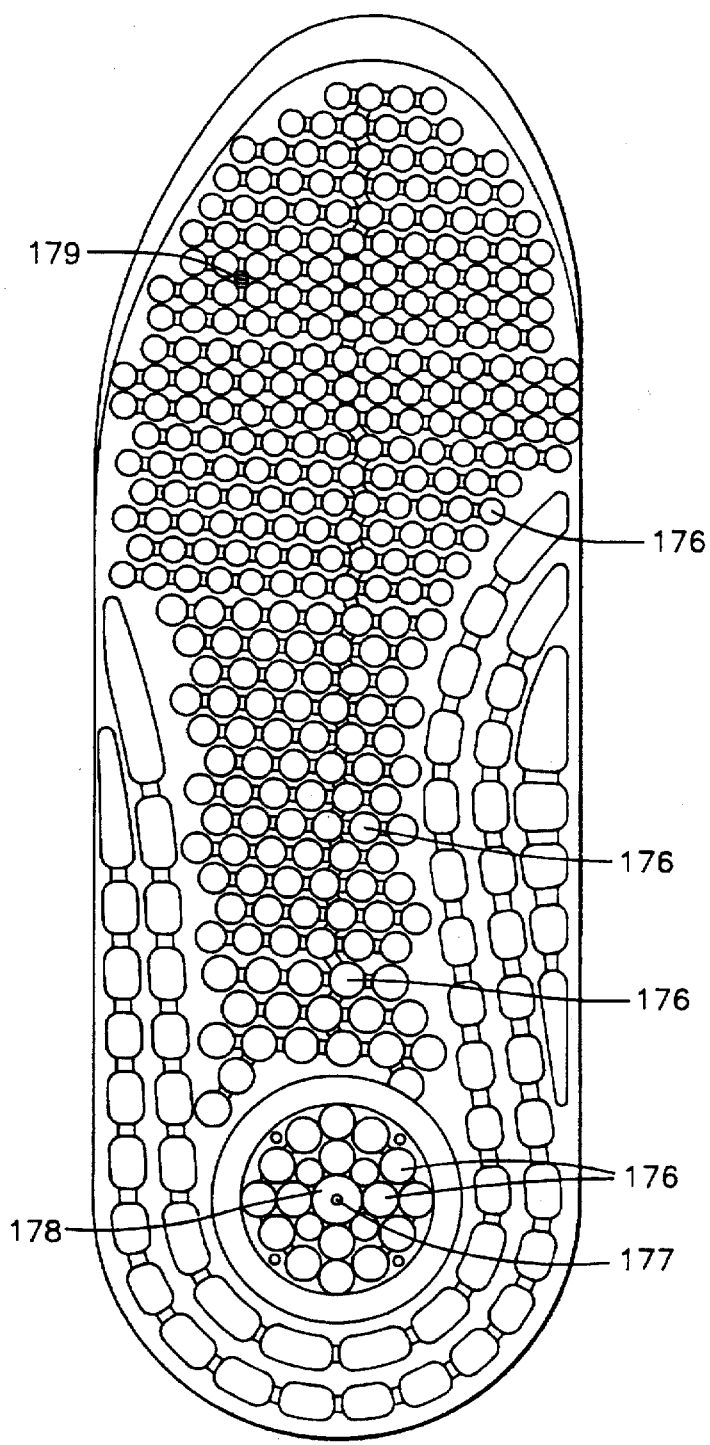
FIGS. 38 and 38A are a plan view and a sectional view on line 38A—38A, respectively, of another air cushion insole.
Figure 38A:
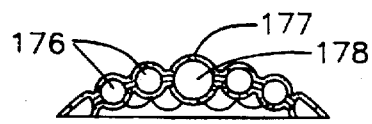

FIGS. 38 and 38A show yet another similar air cushion insole 175 wherein a cluster of the interconnected air chambers 176 in a heel pad region of the insole are disposed in an arched circle. There is an opening 177 in the top of the central air chamber 178 and the cushion includes a unidirectional outlet valve 179 towards the toe. When downward pressure is applied to the arched region by the users heel, opening 177 is closed and air is forced out of the cushion through valve 179. When the users heel is raised, opening 177 is released so that air can be drawn into the cushion. The tendency with this arrangement is for fresh outside air to be drawn in and be circulated around the users foot.

Figure 39:
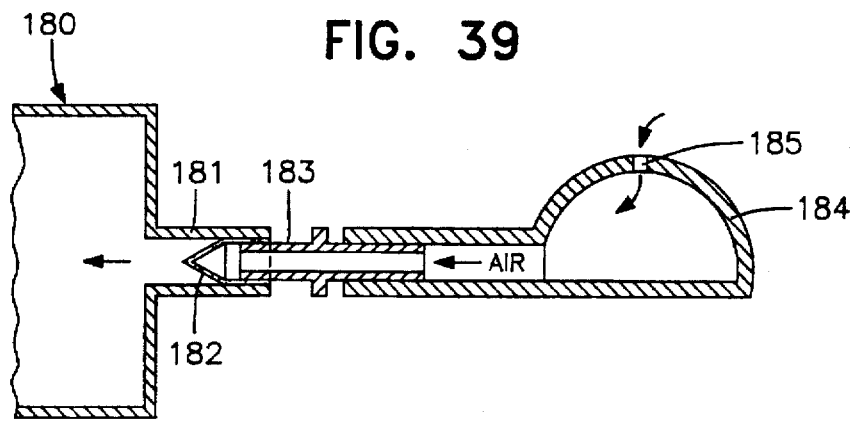
FIGS. 39 and 39A are sectional elevational views of a pump and valve assembly for air cushion insoles showing pumping and air-release positions, respectively.
Figure 39A:
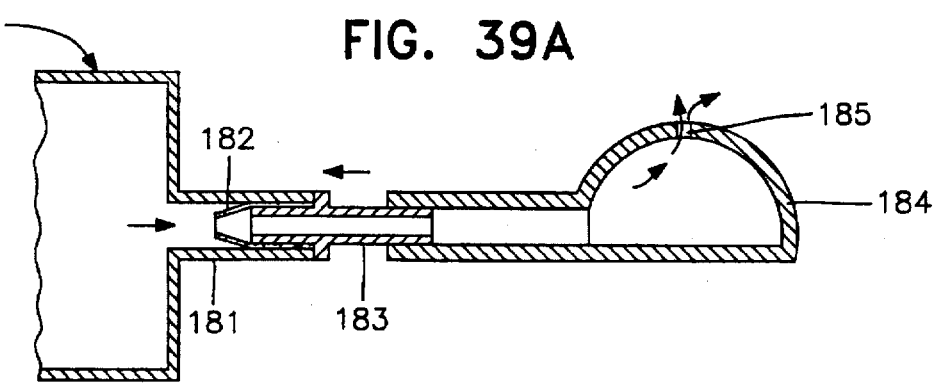

FIGS. 39 and 39A show a simple form of pump and release valve structure for air cushions as previously described. Thus, air cushion 180 has a tubular stem 181 communicating with the interior and in which is inserted a one-way inlet valve 182 of bladder-type which is closed by the pressure of air within the cushion. A longitudinally moveable tube 183 with a central flange has one end inserted in stem 181 and its opposite end inserted in a balloon-type expandable-contractable pump 184. the pump has an air inlet pinhole 185 at its apex. When the air cushion is to be inflated, tube 183 is moved outwardly of stem 181 as in FIG. 39. Then alternately squeezing pump 184, with pinhole 185 covered and releasing the pump, causes air to be pumped through valve 182 and drawn in through pinhole 185. To release air from the cushion, tube 183 is moved inwardly (FIG. 39A) to force valve 182 open and allow air to escape through pinhole 185.

Figure 39B:
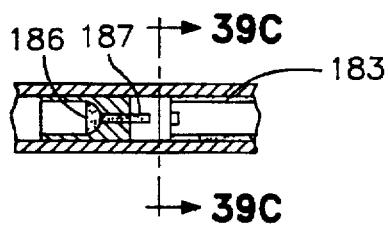
FIGS. 39B and 39C are a sectional elevational view and a cross-section on line 39C—39C, respectively, of an alternative valve structure.
Figure 39C:

FIGS. 39B and 39C show an alternative type of inlet and release valve mechanism having a movable valve 186 with a valve stem 187 having a cross bar which is pushed open by tube 183 when air is to be released from the cushion.

I claim:

1. An insole suitable for use in different size articles of footwear the insole including an arcuate removable portion located around at least one of a toe end and a heel end of the insole to enable the length of the insole to be decreased by removal of said portion, the insole including upper and lower sheets adhered together peripherally and defining therebetween shock-absorbing air chamber means wherein said removable portion is sealed from the air chamber means, wherein the air chamber means comprises a plurality of intercommunicating air chambers and the removable portion comprises a separate arcuate air chamber sealed from said plurality of chambers, the insole with said air chamber attached defining the shape of a larger one of said articles of footwear, the insole with said air chamber removed defining the shape of a smaller one of said articles of footwear.

2. An insole for an article of footwear comprising upper and lower sheets peripherally sealed together and defining therebetween shock-absorbing air chamber means and wherein portions of said sheets are extended at least at one of a heel end and a toe end of the insole to provide a removable portion of the insole selectively sized to fit an article of footwear of a selected length wherein said portion of the insole comprises an air arcuate chamber sealed from said air chamber means the insole with said arcuate air chamber attached defining the shape of a larger article of footwear and with said arcuate air chamber removed defining the shape of a smaller article of footwear.

3. An insole as claimed in claim 2 wherein the air chamber means comprises a plurality of intercommunicating air chambers.

\* \* \* \* \*